(12) United States Patent
Lehmann et al.

(10) Patent No.: US 11,603,334 B2
(45) Date of Patent: Mar. 14, 2023

(54) PROCESS FOR PRODUCING COMPOSITE PARTICLES AND INSULATION MATERIAL FOR THE PRODUCTION OF INSULATING PRODUCTS FOR THE BUILDING MATERIALS INDUSTRY, AND CORRESPONDING USES

(71) Applicant: HÜTTENES-ALBERTUS CHEMISCHE WERKE GESELLSCHAFT MIT BESCHRÄNKTER HAFTUNG, Düsseldorf (DE)

(72) Inventors: Sandra Lehmann, Potsdam (DE); Klaus Riemann, Wunstorf (DE); Nils Zimmer, Garbsen (DE); Fabio Sola, Hannover (DE); Andreas Götz, Marktredwitz (DE)

(73) Assignee: HUTTENES-ALBERTUS CHEMISCHE WERKE GESELLSCHAFT MIT BESCHRANKTER HAFTUNG, Düsseldorf (DE)

( * ) Notice: Subject to any disclaimer, the term of this patent is extended or adjusted under 35 U.S.C. 154(b) by 233 days.

(21) Appl. No.: 16/617,035

(22) PCT Filed: May 30, 2018

(86) PCT No.: PCT/EP2018/064214
§ 371 (c)(1),
(2) Date: Feb. 18, 2020

(87) PCT Pub. No.: WO2018/220030
PCT Pub. Date: Dec. 6, 2018

(65) Prior Publication Data
US 2020/0308067 A1 Oct. 1, 2020

(30) Foreign Application Priority Data

May 30, 2017 (DE) ..................... 10 2017 111 836.5

(51) Int. Cl.
*C04B 38/00* (2006.01)
*C04B 33/04* (2006.01)
(Continued)

(52) U.S. Cl.
CPC .......... *C04B 38/009* (2013.01); *C04B 18/023* (2013.01); *C04B 33/04* (2013.01);
(Continued)

(58) Field of Classification Search
CPC .................................................. C04B 38/009
See application file for complete search history.

(56) References Cited

U.S. PATENT DOCUMENTS 4,256,676 A * 3/1981 Kovach ...................... B01J 2/28
264/0.5
5,492,870 A * 2/1996 Wilcox ................. C01B 13/328
106/409

(Continued)

FOREIGN PATENT DOCUMENTS

| CN | 1772676 | 5/2006 |
| CN | 101654376 | 2/2010 |

(Continued)

OTHER PUBLICATIONS

Watanabe, T., "The Interstratified Structure in Phyllosilicate Minerals—with Special Reference to Interstratified Clay Minerals," Nihon Kessho Gakkaishi, 1995, vol. 37, Issue 4, pp. 206-214, Released on J-STAGE Sep. 30, 2010, Online ISSN 1884-5576, Print ISSN 0369-4585, https://doi.org/10.5940/jcrsj.37.206, https://www.jstage.jst.go.jp/article/jcrsj1959/37/4/37_4_206/_article/-char/en.

*Primary Examiner* — Erin Snelting
(74) *Attorney, Agent, or Firm* — Duane Morris LLP; Gregory M. Lefkowitz; Brandon A. Chan

(57) ABSTRACT

What are described are a process for producing an insulating product for the construction materials industry or an insulating material as intermediate for production of such a product, and a corresponding insulating material/insulating product. Also described are the use of a matrix encapsulation (Continued)

method for production of composite particles in the production of an insulating product for the construction materials industry or of an insulating material as intermediate for production of such a product, and the corresponding use of the composite particles producible by means of a matrix encapsulation method.

17 Claims, 2 Drawing Sheets

(51) Int. Cl.
    *C04B 33/14*    (2006.01)
    *C04B 35/63*    (2006.01)
    *C04B 35/64*    (2006.01)
    *C04B 38/02*    (2006.01)
    *C04B 38/06*    (2006.01)
    *C04B 18/02*    (2006.01)
    *C04B 35/16*    (2006.01)

(52) U.S. Cl.
    CPC .............. *C04B 33/14* (2013.01); *C04B 35/16* (2013.01); *C04B 35/6316* (2013.01); *C04B 35/64* (2013.01); *C04B 38/02* (2013.01); *C04B 38/067* (2013.01); *C04B 2201/32* (2013.01); *C04B 2235/3206* (2013.01); *C04B 2235/3208* (2013.01); *C04B 2235/3217* (2013.01); *C04B 2235/3232* (2013.01); *C04B 2235/3244* (2013.01); *C04B 2235/3409* (2013.01); *C04B 2235/349* (2013.01); *C04B 2235/3418* (2013.01); *C04B 2235/3427* (2013.01); *C04B 2235/36* (2013.01); *C04B 2235/44* (2013.01)

(56) References Cited

U.S. PATENT DOCUMENTS

| | | | |
|---|---|---|---|
| 5,540,834 A | * | 7/1996 | Carr ..................... B01J 20/0211 210/198.2 |
| 2011/0120350 A1 | | 5/2011 | Debrouse |
| 2012/0295026 A1 | * | 11/2012 | Courtois ................. C04B 35/14 427/213.31 |
| 2012/0316053 A1 | | 12/2012 | Francy |
| 2013/0153222 A1 | | 6/2013 | Pisklak et al. |

FOREIGN PATENT DOCUMENTS

| | | |
|---|---|---|
| DE | 2214073 | 9/1973 |
| DE | 102015120866 | 6/2017 |
| EP | 0639544 | 2/1995 |
| WO | 9832713 | 7/1998 |
| WO | 2005087676 | 9/2005 |
| WO | 2010135494 | 11/2010 |
| WO | 2012031717 | 3/2012 |
| WO | 2016008970 | 1/2016 |
| WO | 2017093371 | 6/2017 |

* cited by examiner

FIG. 1
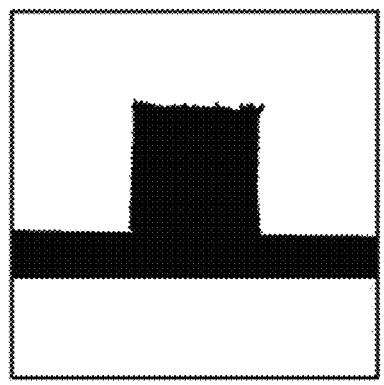
FIG. 2 – Prior Art
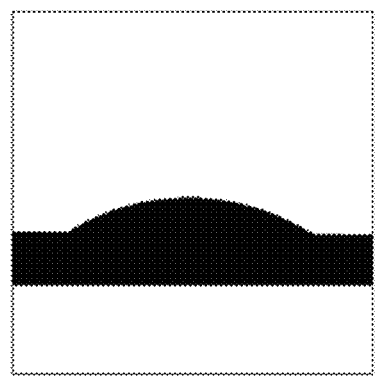
FIG. 3 – Prior Art

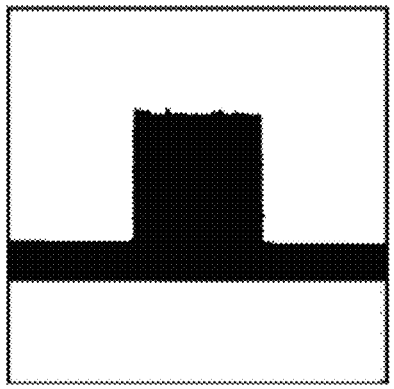
FIG. 4 – Prior Art
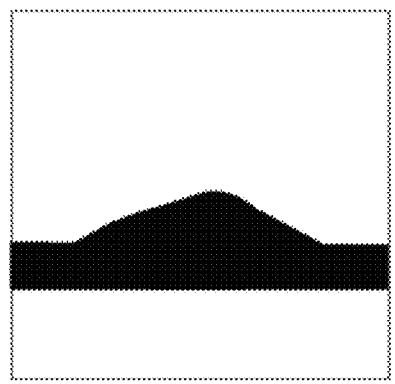
FIG. 5 – Prior Art
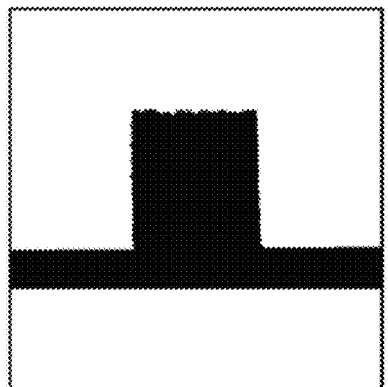
FIG. 6
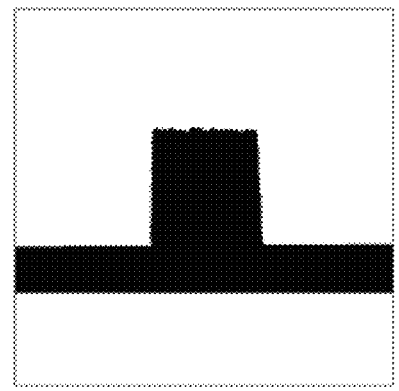
FIG. 7

PROCESS FOR PRODUCING COMPOSITE PARTICLES AND INSULATION MATERIAL FOR THE PRODUCTION OF INSULATING PRODUCTS FOR THE BUILDING MATERIALS INDUSTRY, AND CORRESPONDING USES

CROSS-REFERENCE TO RELATED APPLICATIONS

This application is a § 371 national stage entry of International Application No. PCT/EP2018/064214, filed on May 30, 2018, which claims priority to German Patent Application No. 10 2017 111 836.5, filed on May 30, 2017, the entire contents of which are incorporated herein by reference.

The present invention relates to a process for producing an insulating product for the construction materials industry or an insulating material as intermediate for production of such a product, and to a corresponding insulating material or an insulating product. The present invention likewise describes the use of a matrix encapsulation method for production of composite particles in the production of an insulating product for the construction materials industry or of an insulating material as intermediate for production of such a product, and the corresponding use of the composite particles producible by means of a matrix encapsulation method.

The term "construction materials industry" in the context of the present documents preferably includes the use of the articles of the invention in production or as barrier and insulation material for thermal insulation and for sound insulation, and in production or as material for fireproofing of constructions. Applications of the articles of the invention as described in the present text in other branches of industry, particularly in the foundry industry, are not part of the present invention.

The use of expanded and foamed glasses, perlites or pumice as insulation and barrier material in the construction materials industry is known. In addition, hollow glass microbeads and polymer beads are already being used. There are also combination products available on the market, for example the "Aerosilex" product, which is supplied as an expanded aggregate of a combination of glass with siliceous earth.

Most commonly used at present are insulation materials made from polystyrene. Owing to their high flammability, the formation of toxic gases in the event of fire and the disposal thereof as special waste, the market has long been searching for suitable alternatives. The use of phenolic foam products and polyurethane products is likewise in need of improvement owing to their high combustibility and the emissions released by these products.

The most commonly used organic-based insulation materials, polystyrene, phenolic foams and polyurethane, have much lower thermal conductivity compared to the inorganic insulation materials used to date. Thermal conductivities are reported as 0.035-0.045 W/(m*K) for expanded polystyrene, 0.021-0.024 W/(m*K) for phenolic foams, and 0.020-0.025 W/(m*K) for polyurethane. However, the organic insulation materials are combustible—for instance, construction elements made from polyurethane are classified as having "normal flammability" and "low flammability". Polystyrene as insulation material breaks down above 300° C. and then drips, which can result in spreading of resultant fires. Fireproofing in the case of polystyrene therefore has to be established or increased by addition of flame retardants. Flame retardants used are usually brominated compounds, but these are problematic since they can release gases hazardous to health in the event of fire. A further important property of insulation materials for use in the construction materials industry is therefore low flammability; ideally, such insulation materials are nonflammable.

One of the most important properties of insulation materials for use in the construction materials industry is a good insulation effect, i.e. low thermal conductivity. The thermal conductivity of expanded and foam glasses is in the range from 0.038 to 0.050 W/(m*K). These inorganic substances melt at temperatures of about 700 to 800° C., but are noncombustible.

A further important property of insulation materials for use in the construction materials industry is a low bulk density, such that the resulting construction elements are lighter and the insulation effect can be improved further.

A further important property of insulation materials for use in the construction materials industry is a high thermal stability, meaning that such materials should deform to a minimum degree and ideally not at all even at high temperatures as occur, for example, in the event of a fire. This ensures that construction elements comprising such insulation materials, even in the event of fire, remain stable for a long time and damage to a building or collapse of a building is avoided for as long as possible.

An important property of insulation materials for use in the construction materials industry is likewise a high water stability, especially for building protection.

The known inorganic insulation materials having flame-retardant properties include, for example, the fibrous crystallized silicate minerals such as asbestos. But these are hardly used nowadays owing to the high risk to human health, for instance through asbestosis or an increase in the risk of contracting lung cancer, which is associated with the release of asbestos dust, for example.

In the case of organic insulation materials, it is often pointed out that emissions that are possibly harmful to health arise on utilization. For example, in the case of phenolic foams, formaldehyde emissions have to be expected. A further important property of insulation materials for use in the construction materials industry is therefore low and preferably zero emission of substances harmful to health.

Especially in the case of use of render systems in thin and thick layers, as well as the important properties already mentioned above, additional properties of insulation materials that are of significance are high mechanical strength and high stability to alkalis. For instance, some known materials based on glass or based on perlites can only be used to a limited degree in alkaline render systems since they are soluble at basic pH values. In addition, it is known that perlite absorbs water from the environment and then reacts. For the use of renders in particular, adequate mechanical stability of the insulation materials is also necessary—ultimately, these are to withstand mixing processes and also application by means of spraying, knifing or spreading without loss of function.

Especially when used indoors, the insulation materials are to have high whiteness in order that a pleasing esthetic effect is achieved in addition to the functionality of the construction materials. In addition, the further processing of materials having high whiteness is often simpler, for example in cases in which a different color is to be applied on the white substrate at a later stage.

Document WO 98/32713 describes a lightweight material comprising expanded perlite and a process for production thereof.

Document WO 2005/087676 describes a process for producing foamed glass pellets.

Document WO 2012/031717 describes a thermally insulating fireproof molding and a process for production thereof.

Document DE-A 2214073 describes a process and an apparatus for production of expanded ceramic products.

Document EP 0639544 describes ceramic particles in mesh form.

Document DE 10 2015 120 866 A1 (corresponding to WO 2017/093371 A1) specifies a process for producing refractory composite particles and feeder elements for the foundry industry, to corresponding feeder elements and to uses. There is no disclosure of nonrefractory solids for reducing the melting point, especially those having a melting point or softening temperature less than 1350° C., as constituents of the composite particles described therein.

It was a primary object of the present invention to provide an improved process for producing an insulating product for the construction materials industry or an insulating material as intermediate for production of such a product, which can be adapted without any particular trouble to the practical demands with regard to the properties of the particles present in the insulating material. The process to be specified was to lead to an insulation material comprising particles having a grain size of 10 mm or less. The particles—depending on the individual configuration of the process to be specified—were in particular to have a low bulk density and/or excellent insulation characteristics, i.e. low thermal conductivity.

Preferably, the process to be specified was to include the use or enable the production of filler particles that have one or more, preferably all, of the following properties:
excellent insulation characteristics (i.e. low thermal conductivity),
low or zero flammability,
high thermal stability/resistance (i.e. high and long-lasting mechanical stability even at high temperatures as occur in the event of fire),
low or zero emission of substances harmful to health,
high water resistance,
high mechanical strength,
high resistance to alkalis,
high whiteness,
good pourability,
high sphericity,
flowability,
and
a low bulk density of less than 500 g/L.

The process to be specified for producing an insulating product for the construction materials industry or an insulating material as intermediate for production of such a product should be flexibly adjustable with regard to the production and use of filler particles of variable size. More particularly, the process should enable the production and use of filler particles having a grain size of less than 10 mm, preferably of less than 2 mm, in the production of an insulation material. The filler particles to be produced and used were to be of variable composition. This variability and flexibility of the process to be specified was to enable production of an insulation material having material properties matched individually to the demands of the individual case. The process to be specified for production of an for production of an insulating product for the construction materials industry or an insulating material as intermediate for production of such a product is thus to be more independent, inter alia, of the market availability of filler particles of defined size and composition than the existing corresponding processes.

It was a further object of the present invention to specify a corresponding insulation material or insulating product. Further object of the present invention will be apparent, mutatis mutandis, from the above remarks and will be apparent from the corresponding elucidations in the text that follows.

The invention and combinations of preferred parameters, properties and/or constituents of the present invention that are preferred in accordance with the invention are defined in the appended claims. Preferred aspects of the present invention are also specified or defined in the description that follows and in the examples.

The stated primary object with regard to the process to be specified is achieved in accordance with the invention by a process for producing an insulating product for the construction materials industry or an insulating material as intermediate for production of such a product, having the following steps:
(a) producing composite particles having a grain size of less than 10 mm, preferably of less than 2 mm, determined by sieving, in a matrix encapsulation process having the following steps:
(a1) producing droplets of a suspension composed of at least the following starting materials:
as dispersed phases
(i) one or more substances selected from the group consisting of sheet silicates and clays,
(ii) additionally one or more density-reducing substances selected from the group consisting of lightweight fillers having a respective bulk density in the range from 10 to 350 g/L, blowing agents and pyrolyzable fillers
and
(iii) one or more nonrefractory solids for reducing the melting point of the composite particles in addition to constituents (i) and (ii),
and as continuous phase
(iv) a solidifiable liquid,
(a2) solidifying the solidifiable liquid, such that the droplets harden to give hardened droplets, and
the (i) substance(s) selected from the group consisting of sheet silicates and clays,
the (ii) density-reducing substance(s) and
the (iii) nonrefractory solid(s)
are encapsulated in the solidifying continuous phase,
(a3) treating (preferably heat-treating) the hardened droplets so as to result in said composite particles, the treating comprising a sintering of the hardened droplets.

One finding on which the invention is based is that matrix encapsulation (encapsulation) of the starting materials specified in step (a1) (see points (i) to (iv) in step (a1)) can produce composite particles having the primary properties listed above.

Preference is given to a process of the invention as described above (especially a process described in this text as preferred), comprising, as an additional step:
(b) producing the insulating product for the construction materials industry or the insulating material as intermediate for production of such a product using the composite particles from step (a).

Preference is further given to a process of the invention as described above (especially a process described above or hereinafter as preferred) wherein the insulating product produced for the construction materials industry or the insulating material produced as intermediate for production of such a product is selected from the group consisting of:

indoor and outdoor wall and roof linings, preferably fillings, lightweight construction panels, preferably lightweight construction panels for refurbishment and modernization construction, and/or acoustic panels;

indoor and outdoor render systems, preferably thick-layer render systems, preferably refurbishment renders, render and drying mortar systems, tile adhesives, construction adhesives, leveling compounds, spackling compounds, sealing compounds, filling compounds, wall fillers and/or loam renders;

thin-layer systems, preferably emulsion paints and/or wallpapers, and resin systems for the construction materials industry, preferably polymer concrete and/or mineral granite, synthetic stone, composite stone and/or ready-made sanitary ware.

The composite particles produced by the process of the invention have a grain size of less than 10 mm, preferably less than 2 mm, determined by sieving. Determination by sieving is effected in accordance with DIN 66165-2 (4.1987) using Method F specified therein (machine sieving with moving individual sieve or sieve set in gaseous static fluid). A vibratory sieving machine of the RETSCH AS 200 control type is used; the amplitude is set here to level 2; there is no interval sieving; the sieving time is 1 minute.

The composite particles produced by the process of the invention are additionally nonflammable and noncombustible. The composite particles produced by the process of the invention are preferably also free-flowing.

In the context of the present invention, a particle or material (for example an amount of particles of the same composition) is considered to be thermally stable if the particle or material neither melts nor softens or even breaks down with loss of its three-dimensional shape below a given upper temperature limit (e.g. 1100° C.).

The feature "producing droplets of a suspension from at least the starting materials that follow" comprises the "producing of droplets of a suspension from exclusively the starting materials that follow" and the "producing of droplets of a suspension from the starting materials that follow and further starting materials".

A "matrix encapsulation process" is understood in the present text to mean a process in which droplets of a suspension (or dispersion) are first prepared, said suspension (or dispersion) comprising one or more substances in the solid or liquid state suspended in a matrix (continuous phase). The droplets are used to produce composite particles by solidification and optionally subsequent treatment. The process of the invention comprises, in its step (a), a specific matrix encapsulation process with the above-defined component steps. A typical process for production of core-shell particles differs from the matrix encapsulation process in that the shell material in core-shell particles encases just a single core. This single core of a typical core-shell particle does not comprise any binder that binds other constituents of the core.

"Density-reducing substances" in the context of the present invention are substances which, when used in the process of the invention, have the effect of achieving a reduced bulk density of the resultant composite particles in step (a3), as compared with a noninventive (comparative) process that has been conducted in an identical manner except that, for the purpose of the comparison, these "density-reducing substances" are not used. Depending on the treatment of a hardened droplet, a blowing agent used or a pyrolyzable filler used may or may not expand or be pyrolyzed. Only when a blowing agent used expands or a pyrolyzable filler used is pyrolyzed (in step (a3)) does it fulfill the "density-reducing" criterion.

"Lightweight fillers" used in accordance with the invention are fillers each having a bulk density in the range from 10 to 350 g/L. Lightweight fillers preferred for use in the process of the invention are spheres, preferably spheres of fly ash, for example "Fillite 106" spheres from Omya GmbH, or glass, for example the glass with the "GHL 450" name from LUH Georg H. Luh GmbH, the product with the "JJ Glass Bubbles" name from Jebsen & Jessen GmbH & Co. KG, the product with the "Q-cel0300" name from Potters Industries or the "K1", "K15" or "K20" products from 3M.

"Blowing agents" are substances that expand on treatment of the hardened droplets in step (a3), for example in the course of heating, or release blowing gases and hence produce cavities in the composite particle.

"Pyrolyzable fillers" are fillers that are pyrolyzed partly or completely, preferably completely, on treatment of the hardened droplets in step (a3), for example in the course of heating.

A pyrolyzable filler may simultaneously be a lightweight filler having a respective bulk density in the range from 10 to 350 g/L. A pyrolyzable filler may simultaneously be a blowing agent. A blowing agent may simultaneously be a lightweight filler having a respective bulk density in the range from 10 to 350 g/L.

Composite particles that are produced in step (a) of the process of the invention, owing to the use of the density-reducing substances in step (ii), have a particularly low bulk density, but one adjusted individually according to the demands of the individual case, and, especially in the case of use of blowing agents and/or pyrolyzable fillers, have a high porosity, but one adjusted individually according to the demands of the individual case, such that the resulting individually produced composite particles have a high insulating effect and a low bulk density.

"Nonrefractory solids" used in accordance with the invention are inorganic solids that serve to reduce the melting point of the composite particles in step (a1) (see point (iii)). "Nonrefractory solids" do not meet the requirements for fire resistance or for the "fire-resistant" criteria according to DIN 51060:2000-06.

Density-reducing substances in step (a1), point (ii) of the process of the invention, for the purposes of the present text, cannot also be "nonrefractory solids".

Preference is given to a process of the invention as described above (especially a process described above or hereinafter as preferred) wherein the one or more nonrefractory solids used as additional starting material (iii) for reduction of the melting point of the composite particles are inorganic materials selected from the group consisting of amorphous oxides, amorphous silicates, crystalline oxides and crystalline silicates and mixtures thereof, preferably selected from the group consisting of amorphous silicates and crystalline silicates, and/or (preferably "and")

having a melting point or softening temperature lower than 1350° C.

The melting point or softening temperature of the nonrefractory solids used in accordance with the invention is preferably determined by heating microscopy, preferably with an EM 301 (model M17) heating microscope from Hesse Instruments, Germany (see the relevant details on the website at the following address: http://www.hesse-instruments.de/content/products.php?Hllang=de) preferably with selection of the following measurement conditions: 1st heating rate: 80 K/min until attainment of 700° C. (no hold time); 2nd heating rate: 50 K/min until attainment of 1500° C. (no hold time) and 3rd heating rate at 10 K/min until attainment of 1650° C. (hold time 5 s). The softening temperature is determined to the standard DIN 51730 (1998-4) (or ISO 540:1995-03).

It has been found that, when the aforementioned nonrefractory solids used with preference in accordance with the invention are used, it is possible to produce the composite particles at temperatures below 1000° C., but the composite particles produced nevertheless have high thermal stability (measured as "softening temperature") which is generally above 1000° C. However, the composite particles which comprise nonrefractory solids and are produced by the process of the invention, by comparison with composite particles of otherwise identical composition and production, have lower melting points.

Preference is given to a process of the invention as described above (especially a process described above or hereinafter as preferred) wherein the one or more nonrefractory solids used as additional starting material (iii) for reduction of the melting point of the composite particles are selected from the group consisting of: glass flours, feldspar, boric acid and boron salts such as sodium tetraborate and sodium perborate, where the one non-refractory solid or at least one of the multitude of nonrefractory solids for reduction of the melting point of the composite particles is preferably selected from the group consisting of glass flours and albite,
more preferably
selected from the group of the glass flours having a whiteness >80,
and/or
selected from the group of the recycled glass flours.

In the context of the present invention, "whiteness" means the whiteness by the Tappi method (R457 whiteness), preferably measured with a Minolta CM-2600 d spectrometer (see details from the manufacturer at its website at the address: https://www.konicaminolta.eu/de/messderaete/produkte/farbmessung-glanzmessung/spektralphotometer-portabel/cm-2600 d-cm-2500d/technische-daten.html), with the following settings: mask average (MAV); measurement with and without specular component (SCI+SCE) and 0% UV component. The measurements are read out with the following specifications: standard illuminant C, observer angle 2° (C-2), without specular component and with 0% UV (SCE/0). The following "L*a*b values" are used: 065-10, SCI/0 (standard illuminant D65, observer angle 10° (065-10) including specular component and 0% UV (SCI/0).

Glasses that meet the criterion specified above for lightweight fillers of a respective bulk density in the range from 10 to 350 g/L (see step (a1), point (ii) of the process of the invention), for example foamed or expanded glasses, are not regarded as "nonrefractory solids" for the purposes of the present text.

Glass flours, owing to their already advantageous properties such as high grain strength, high whitenesses, fire resistance (especially nonflammability), frost resistance, insulating action and chemical stability, are particularly suitable as nonrefractory solids in the process of the invention. Recycled glass flours have the further advantage of requiring only comparatively low energy expenditure in production. Albite (also referred to as sodium feldspar) has a comparatively low melting point and high whiteness, such that it is particularly suitable as nonrefractory solid for use in the process of the invention.

Particular preference is given to a process of the invention as described above (especially a process described above or hereinafter as preferred) wherein the total amount of nonrefractory solids used as component (iii) is in the range from 5% to 60% by weight, preferably in the range from 10% to 50% by weight, more preferably in the range from 20% to 40% by weight, based on the total amount of the suspension produced in step (a1).

Based on the total solids content of the suspension produced in step (a1), the total amount of nonrefractory solids used as component (iii) is preferably in the range from 2% to 20% by weight, more preferably in the range from 3% to 18% by weight and most preferably in the range from 5% to 15% by weight.

Preference is further given to a process of the invention as described above (especially a process described above or hereinafter as preferred) wherein the nonrefractory solids used as component (iii) have a particle size distribution determined by laser diffraction as the D50 value in the range from 3 to 60 μm, preferably in the range from 4 to 50 μm, more preferably in the range from 5 to 40 μm.

The particle size distributions determined as "050 values" in the context of the present invention are preferably ascertained and reported in a manner known per se by laser diffraction as D50 values of the cumulative frequency distribution of the volume-averaged size distribution function, meaning that 50% by volume of the corresponding particles examined in each case has a particle size equal to or less than the D50 value reported in each case. The size distribution curve of the corresponding particles is preferably determined to ISO 13320-1 (1999), preferably with a "Mastersizer 3000" laser diffraction instrument from Malvern, Great Britain, according to manufacturers instructions. The scattered light signals are preferably evaluated by the Mie theory, which also takes account of refraction and absorption characteristics of the corresponding particles.

The nonrefractory solids used above as component (iii) may be used individually or in combination with one another.

Preference is additionally given to a process of the invention as described above (especially a process described above or hereinafter as preferred), wherein the coloring agent for white color used in step (a1)
in constituent (i) is one or more substances selected from the group consisting of sheet silicates and clays,
and/or
in constituent (iii) is one or more nonrefractory solids for reducing the melting point of the composite particles, preferably glass flours and or albite,
and/or
an additional constituent used is one or more additional starting materials, preferably selected from the group of the refractory solids, more preferably selected from the group consisting of titanium dioxide, cristobalite, aluminum oxide.

The possibility of using components that impart high whiteness to the insulating products or insulation materials produced in the process of the invention is a particular advantage of the invention. Insulation materials having high whiteness are in high demand in the construction materials industry since they have not only a high esthetic effect but also often facilitate subsequent or further practical operations, especially with color paints. For example, fewer painting operations are often needed on white substrates, or paints on white substrates are often more intense or more true in color.

Preference is likewise given to a process of the invention as described above (especially a process described above or hereinafter as preferred) wherein in step (a1) droplets are provided by means of one or more nozzles, preferably vibration nozzles, and/or in step (a2) the solidifying of the solidifiable liquid is induced by cooling, drying or chemical reaction.

The use of one or more nozzles, preferably vibration nozzles, is preferred in step (a1) in order to produce the composite particles in a time-efficient manner and with maximum homogeneity of grain size.

Preference is also given to a process of the invention as described above (especially a process described above or hereinafter as preferred) wherein the solidifiable liquid used in step (a1) is a liquid solidifiable by chemical reaction and the solidifying of the solidifiable liquid in step (a2) is induced by chemical reaction.

The solidifying of the solidifiable liquid by chemical reaction has the advantage that this operation is generally irreversible and is additionally fast enough, such that the solidifiable liquid generally retains the shape of the droplet on dropwise addition and hence on solidification of the solidifiable liquid. Solidifications by physical methods, for example cooling or drying, are reversible in some cases and can be (at least partly) reversed in these cases, for example by the supply of heat or moisture.

Particular preference is given to a process of the invention as described above (especially a process described above or hereinafter as preferred) wherein the solidifiable liquid is a liquid solidifiable by cation exchange reaction, preferably a liquid solidifiable by reaction with calcium ions and/or barium ions and/or manganese ions, preferably by reaction with calcium ions.

Cation exchange reactions in practice have the advantage that they are regularly complete within a comparatively short period of time. In step (a2), preference is given to the performance of a cation exchange reaction in which the solidifiable liquid contains monovalent cations and is contacted with calcium ions in order thus to solidify the solidifiable liquid; rather than calcium ions, it is alternatively possible to use barium ions or manganese ions. In the preferred procedure, monovalent cations present in the solidifiable liquid are exchanged for calcium ions, in order thus to solidify the solidifiable liquid. Calcium ions have a balanced ratio between charge and ion mobility. It is generally the case that the charge of the cation that is to be exchanged with the monovalent cation present in the solidifiable liquid should be at a maximum in order that sparingly soluble compounds form on cation exchange. But the cation should also have maximum ion mobility in order that the desired chemical reaction proceeds with maximum speed. The ion mobility of cations decreases with increasing cationic charge.

Particular preference is given to a process of the invention as described above (especially a process described above or hereinafter as preferred) wherein the solidifiable liquid is a liquid solidifiable by reaction with calcium ions, comprising one or more binders selected from the group consisting of alginate, polyvinyl alcohol (PVA), chitosan and sulfoxyethyl cellulose, and/or (preferably "and")

an aqueous solution, wherein the solidifiable liquid is preferably an aqueous alginate solution, wherein the solidifiable liquid is more preferably an aqueous sodium alginate solution.

Alginate solutions, especially sodium alginate solutions, preferably in the form of an aqueous solution, are particularly suitable for use as a liquid solidifiable by reaction with calcium ions in a process of the invention since they are environmentally friendly, degradable and, in particular, non-toxic. Moreover, such alginate solutions can be solidified in a reproducible and standardized manner. The composite particles obtained in in-house studies, produced using alginate solutions as solidifiable liquid, had a homogeneous construction with uniformly distributed or arranged particles.

Preference is given to a process of the invention as described above (especially a process described above or hereinafter as preferred) wherein the or at least one of the lightweight fillers used in step (a) as density-reducing substance of component (ii), preferably having a grain size of less than 0.4 mm, more preferably less than 0.3 mm, most preferably less than 0.2 mm, determined by sieving (see above for method of determination to DIN 66165-2 (4.1987)), is selected from the group consisting of:

inorganic hollow beads, preferably of borosilicate glass, organic hollow beads, particles of porous and/or foamed material, rice husk ash, core-shell particles and calcined kieselguhr and/or wherein the or at least one of the blowing agents used in step (a) as component (ii) is selected from the group consisting of:

carbonates, hydrogencarbonates and oxalates, preferably with cations from the group consisting of alkali metals and alkaline earth metals, preferably calcium carbonates, hydrogencarbonates and oxalates, plant flours, preferably selected from the group consisting of coconut shell flour, preferably coconut shell flour with the "Coconit 300" name from Mahlwerk Neubauer-Friedrich Geffers GmbH, walnut shell flour, preferably walnut shell flour with the "Walnusschalenmehl 200m" name from Ziegler Minerals, grape seed flour, preferably grape seed flour with the "Traubenkernmehl M100" name from A+S BioTec, olive kernel flour, preferably olive kernel flour with the "OM2000" or "OM3000" name from JELU-Werk, wheat flour, preferably wheat flour with the "Mehl 405" name from Hummel, corn flour, preferably corn flour with the "Maismehl, MK100" name from Hummel, wood flour, preferably wood floor with the "Holzmehl Ligno-Tech 120mesh TR" name from Brandenburg Holzmühle, sunflower husk flour and cork flour, starch, potato dextrin, sugar, e.g. sucrose, plant seeds, and rice husk ash, preferably rice husk ash with a high carbon content, for example a rice husk ash with the "Nermat AF (<80 μm)" name from Refratech.

and/or wherein the or at least one of the pyrolyzable fillers used in step (a) as component (ii) is selected from the group consisting of:

polymer beads, preferably "Expancel® 091 DE 80 d30" or "Expancel® 920 DE 80" polymer beads from Akzo Nobel or "SPHERE ONE EXTENDOSPHERES™ PM 6550 Hollow Plastic Spheres" polymer beads from KISH Company Inc.

and styrofoam beads, preferably "F655-N" styrofoam beads from BASF.

Particular preference is given to a process of the invention as described above (especially a process described above or hereinafter as preferred) wherein the total amount of density-reducing substances used as component (ii) is in the range from 2% to 40% by weight, preferably in the range from 5% to 30% by weight, more preferably in the range from 10% to 20% by weight, based on the total amount of the suspension produced in step (a1).

Based on the total solids content of the suspension produced in step (a1), the total amount of density-reducing substances used as component (ii) is preferably in the range from 0.5% to 14% by weight, more preferably in the range from 1.0% to 10% by weight and most preferably in the range from 3% to 7% by weight.

Preference is further given to a process of the invention as described above (especially a process described above or hereinafter as preferred) wherein the density-reducing substances used as component (ii) each have a particle size distribution determined by laser diffraction as the D50 value in the range from 10 to 250 µm, preferably in the range from 20 to 150 µm, more preferably in the range from 50 to 90 µm (see above for method of determination).

Preference is further given to a process of the invention as described above (especially a process described above or hereinafter as preferred) wherein the total amount of the lightweight fillers used is in the range of up to 30% by weight, more preferably in the range from 1% to 10% by weight, especially preferably in the range from 3% to 5% by weight, based on the total amount of the suspension produced in step (a1), and/or the total amount of blowing agents used is in the range of up to 30% by weight, more preferably in the range from 1% to 20% by weight, especially preferably in the range from 3% to 10% by weight, based on the total mass of the suspension produced in step (a1), and/or the total amount of pyrolyzable fillers used is in the range of up to 30% by weight, more preferably in the range from 1% to 20% by weight, especially preferably in the range from 3% to 10% by weight, based on the total mass of the suspension produced in step (a1).

The above lightweight fillers used as component (ii) may be used individually or in combination with one another.

The above pyrolyzable fillers used as component (ii) may be used individually or in combination with one another.

Particular preference is given to a process of the invention wherein at least one of the blowing agents used in step (a) as component (ii) is selected from the group consisting of:

wood flour, preferably wood flour with the "Holzmehl Ligno-Tech 120mesh TR" name from Brandenburg Holzmühle, corn flour, preferably corn flour with the "Maismehl MK100" name from Hummel, sugar, e.g. sucrose.

The above blowing agents used as component (ii) may be used individually or in combination with one another.

The lightweight fillers, blowing agents and pyrolyzable fillers used above as component (ii) may each be used individually or in combination with one another.

The aforementioned density-reducing substances (lightweight fillers, blowing agents or hydrolyzable fillers) for production of composite particles having particularly low bulk density are available on the market to a high degree. Their use in the process of the invention enables the reproducible production of lightweight insulating products of low flammability for the construction materials industry or of insulation materials for production of such products, each having excellent insulation properties.

Particular preference is given to a process of the invention as described above (especially a process described above or hereinafter as preferred) wherein one or more refractory solids are used in step (a1) as additional starting material for production of a further dispersed phase, preferably in a proportion of not more than 10% by weight, based on the total amount of the solid constituents of the suspension produced in step (a1), wherein the or at least one of the refractory solids used additionally in step (a1) is preferably selected from the group consisting of:

oxides of one or more elements from the group consisting of Si, Al, Zr, Ti, Mg and Ca, and mixed oxides each comprising one or more elements from the group consisting of Si, Al, Zr, Ti, Mg and Ca, wherein the proportion of the total amount of the constituents from this group is preferably not more than 10% by weight, based on the total amount of the solid constituents of the suspension produced in step (a1), wherein the or at least one of the refractory solids used additionally in step (a1) is preferably selected from the group consisting of:

aluminum oxide (e.g. CAS No. 21645-51-2), zirconium oxide (e.g. CAS number 1314-23-4), titanium dioxide (e.g. CAS number 13463-67-7), silicon dioxide (e.g. quartz with CAS number: 14808-60-7 or vitreous SiO2 with CAS numbers: 60676-86-0), magnesium oxide (e.g. CAS number: 1309-48-4), calcium oxide (e.g. CAS number 1305-78-8), calcium silicate (e.g. CAS number: 1344-95-2), sheet silicates, preferably mica, aluminum silicates, and magnesium aluminum silicate, preferably cordierite, wherein the proportion of the total amount of the constituents from this group is preferably not more than 10% by weight, based on the total amount of the solid constituents of the suspension produced in step (a1).

The term "refractory" in the context of the present invention has the meaning here in accordance with the definition in DIN Standard 51060:2000-06.

The aforementioned refractory solids may be used individually or in combination.

Any refractory solids used in step (a1) are preferably particles, preferably particles of refractory substances, preferably refractory solids having a grain size of less than 0.1 mm, preferably determined by sieving to DIN 66165-2 (4.1987) using Method D specified therein (machine sieving with a static individual sieve in gaseous moving fluid, with air jet sieve).

Through the use of additional refractory solids—according to the envisaged use of the insulating product to be produced in accordance with the invention or of the insulation material as intermediate—it is possible to vary its degree of thermal stability and/or thermal durability (low flammability).

Also preferred is a process of the invention as described above (especially a process described above or hereinafter as preferred) wherein the substance or at least one of the substances used in step (a1) as substance of component (i)

is selected from the group consisting of sheet silicates and clays that do not melt in an incongruent manner below 1500° C.

and/or is selected from the group consisting of the sheet silicates kaolinite, montmorillonite and illite, and the clays kaolin and bentonite.

The term "incongruent melting" is understood in the context of the present invention and in accordance with the customary meaning in the specialist field to mean a melting operation in which the solid starting phase breaks down in the course of melting and/or reacts with the liquid phase formed. Any liquid phase formed here has a different chemical composition than the solid starting phase.

The sheet silicates and/or clays used with preference in the process of the invention, preferably clays, more preferably kaolin, on thermal treatment in step (a3), even at comparatively low temperatures, can be transformed to another phase of exceptional thermal stability and hence contribute, inter alia, to better thermal stability of the composite particles produced. Such a phase transformation can typically be detected by means of XRD measurement.

All the aforementioned sheet silicate and clay species can also be used in a mixture with one another.

The above preferred sheet silicates may be used individually or in combination with one another.

Particularly preferred kaolins for use as sheet silicates in step (a1) are:

"Satintone W" from BASF

Kaolin calz. 3844 from Ziegler & Co. GmbH

The above particularly preferred kaolins may be used individually or in combination with one another.

A particularly preferred bentonite for use as clay in step (a1) is "Bentonit® Volclay" from Süd Chemie.

The above particularly preferred bentonites may be used individually or in combination with one another.

Particular preference is given to a process of the invention as described above (especially a process described above or hereinafter as preferred) wherein the total amount of sheet silicates and clays used as component (i) is in the range from 2% to 40% by weight, preferably in the range from 5% to 30% by weight, more preferably in the range from 10% to 20% by weight, based on the total amount of the suspension produced in step (a1).

Based on the total solids content of the suspension produced in step (a1), the total amount of sheet silicates and clays used as component (i) is preferably in the range from 0.5% to 14% by weight, more preferably in the range from 1.0% to 10% by weight and most preferably in the range from 3% to 7% by weight.

Preference is further given to a process of the invention as described above (especially a process described above or hereinafter as preferred) wherein the sheet silicates and clays used as component (i) each have a particle size distribution in the range from 1 to 30 µm, preferably in the range from 1 to 20 µm, more preferably in the range from 1 to 10 µm, preferably determined by laser diffraction as the D50 value as specified above.

Preference is given to a process of the invention as described above (especially a process described above or hereinafter as preferred) wherein the treating in step (a3) is conducted in such a way that the bulk density of the resultant composite particles in step (a3) is lower than the bulk density of the hardened droplets in the dried state (this is accomplished particularly easily, for example, with use of density-reducing substances selected from the group consisting of blowing agents and pyrolyzable fillers, when the treatment is conducted in such a way that it leads to the expansion of the blowing agents or to the pyrolyzing of the pyrolyzable fillers)

and/or said resultant composite particles in step (a3) have a bulk density <500 g/L, preferably <400 g/L, more preferably <300 g/L.

In the context of the present invention, it has been recognized that, in the case of specific selection of constituents (i), (ii), (iii) and (iv) used in step (a1), by a controlled treatment of the hardened droplets in step (a3), a reduction in the bulk density which is required in many cases is achievable (in that constituents are pyrolyzed, for example, or are converted with release of blowing gases). There is surprisingly no adverse effect here on the dimensional stability or thermal stability of the composite particle formed from the hardened droplet.

Composite particles having a bulk density of <500 g/L, preferably <400 g/L, more preferably <300 g/L, combine, inter alia, the properties of a low bulk density, a high insulating effect and an adequate thermal stability that are advantageous for use as insulation material in the construction materials industry; their use in the process according to the invention is therefore particularly preferred.

In many cases, preference is given to a process of the invention as described above (especially a process described above or hereinafter as preferred) wherein all or some of the resultant composite particles in step (a3) have a grain size of <1.5 mm, preferably at least some have a grain size in the range from 0.1 mm to 0.5 mm and more preferably at least some have a grain size in the range from 0.1 mm to 0.3 mm, determined by sieving (see above for method of determination to DIN 66165-2 (4.1987)).

Composite particles having a grain size of less than 1.5 mm that are produced by the process of the invention have good pourability and particularly good processibility to give an insulating product for the construction materials industry or to give an insulation material as intermediate for that purpose; the production thereof in step (a) of the process of the invention is therefore preferred.

Frequently, preference is also given to a process of the invention as described above (especially a process described above or hereinafter as preferred) wherein component (ii) comprises, as density-reducing substance(s), one or more blowing agents and the treating in step (a3) is conducted in such a way that the one or more blowing agents expand and hence form cavities in the resultant composite particle and/or one or more pyrolyzable fillers and the treating in step (a3) is conducted in such a way that the one or more pyrolyzable fillers pyrolyze and hence form cavities in the resultant composite particle.

The forming of cavities in step (a3) with use of blowing agents or pyrolyzable fillers is one particular aspect of the present invention since the bulk density of the resultant composite particles is thus crucially reduced and the insulating effect increased. The amount and grain size of the blowing agents or pyrolyzable fillers are relevant parameters for the bulk density and porosity of the resulting composite particles.

In many cases, preference is also given to a process of the invention as described above (especially a process described above or hereinafter as preferred)

wherein component (i) in step (a1) comprises at least one clay, preferably containing kaolinite and/or illite, and/or wherein the treating in step (a3) comprises sintering at a temperature in the range from 900 to 980° C., preferably forming a sintered composite.

Under the conditions of the process of the invention, it has been possible to produce composite particles having a number of advantageous properties as insulation material for the construction materials industry at a comparatively low temperature in the range from 900 to 980° C., preferably in the range from 930 to 970° C., and preferably with a treatment time in the range from 15 to 90 min, more preferably with a treatment time of 20 to 60 min, most preferably with a treatment time in the range from 30 to 45 min.

Preference is further given to a process of the invention as described above (especially a process described above or hereinafter as preferred) without exceedance of a temperature of 1000° C. in the sintering in step (a3).

A process regime at such a comparatively low temperature is particularly favorable since the process can be executed in this way without any special technical measures (as would be necessary in the case of performance of reactions above 1000° C.), for example in a standard tubular furnace, and has a comparatively low energy demand. The process of the invention, even under these conditions, achieves sintering of the surface of the composite particles formed, with a reduction in the surface area thereof but at the same time no significant decrease in the internal porosity thereof. As a result, this sintering leads to another significant increase in strength of the composite particles produced by the process of the invention compared to composite particles produced by similar prior art processes.

Preference is given to a process as described above (especially a process described above or hereinafter as preferred) wherein the hardened droplets are sintered in step (a3) so as to result in solid particles as intermediate, and wherein the surface of these solid particles is subsequently sealed, preferably by means of an organic coating composition or a silicon-containing binder, so as to result in said composite particles. In the individual case, the use of other inorganic coating compositions is advantageous.

Preference is given here, in step (a3), to washing the hardened droplets prior to the sintering and preferably drying the resulting washed droplets. After the washing (and optionally drying), further treatment steps are then conducted, preferably treatment steps as described above as preferred.

In the production of insulating products for the construction materials industry or of an insulating material as intermediate for the purpose, by the process of the invention and hence using composite particles produced in the inventive manner, a high porosity of said composite particles is observed in many cases. If the aforementioned products or intermediates are processed further using binders, a high porosity may result in an elevated consumption of binders. This is undesirable especially when organic binders are used, since this can firstly lead to elevated costs and to incorporation of further materials that are not otherwise required and in the worst case are harmful (for instance are harmful to health or promote fire). In order to reduce the binder consumption, it is therefore advantageous to seal the surface or superficial pores of said composite particles.

A particularly preferred organic coating composition is egg white, which is preferably applied in the form of an aqueous solution. An aqueous egg white solution is preferably produced by mixing an egg white powder with water. Corresponding egg white solutions are produced, for example, with:

standard egg white powder (product number 150061) from NOVENTUM Foods, high-whip egg white powder (product number 150062) from NOVENTUM Foods, and high-gel egg white powder (product number 150063) from NOVENTUM Foods.

Egg white is particularly preferred as an organic coating composition since it gives excellent sealing of the surface of the composite particles and hence reduces their ability to absorb binder in an advantageous manner.

Particularly preferred nonorganic coating compositions are silicon-containing binders, preferably alkoxysilanes ("silanes") and/or alkoxysiloxane ("siloxane") mixtures, especially the SILRES® BS 3003 product from Wacker Silicones. Nonorganic coating compositions such as the preferred alkoxysilanes and alkoxysiloxane mixtures have the advantage of being water-repellent and heat-resistant.

The preferred coating compositions as described above are directly available on the market, nontoxic and easily processible.

Preference is given to a process as described above (especially a process described above or hereinafter as preferred), wherein the resultant composite particles in step (a3) are characterized by (A) a whiteness W≥65, preferably W≥80, more preferably W≥90 (see above for method of determination), and/or (B) a thermal conductivity value at room temperature (20° C.) γR of ≤0.26 W/m*K, preferably ≤0.10 W/m*K, more preferably ≤0.07 W/m*K (see below for method of determination), and/or (C) an alkali stability, determined as the weight loss in the course of storage in sodium hydroxide solution at pH 14 for 30 days, of ≤9% by mass, preferably ≤8% by mass, more preferably ≤7% by mass (see below for method of determination), based on composite particles having a grain size in the range of 0.5 to 1.0 mm, determined by sieving (see above for method of determination to DIN 66165-2 (4.1987)), and/or (D) a grain strength ≥1.5 N/mm², preferably ≥2.0 N/mm², more preferably ≥4.0 N/mm², determined to DIN EN 13055-1:2008-08, Annex A (Method 1, agitating for 2*30 s with amplitude 0.5), at a grain size in the range of 0.25-0.5 mm, determined by sieving (see above for method of determination to DIN 66165-2 (4.1987)), and/or (E) a water absorption capacity, determined via water absorption according to Enslin, of ≤2.5 mL/g, preferably ≤2.0 mL/g and more preferably ≤1.7 mL/g (see below for method of determination), and/or (F) a water solubility, determined as the weight loss in the course of storage in distilled water for 30 days, of ≤2% by mass, preferably ≤1% by mass, more preferably ≤0.2% by mass (see below for method of determination), based on composite particles having a grain size in the range of 0.5 to 1.0 mm, determined by sieving (see above for method of determination to DIN 66165-2 (4.1987)),
and/or
(G) a softening temperature 900° C., preferably 1000° C., more preferably 1200° C., determined by heating microscopy (see above for method of determination).

In a particularly preferred embodiment of the process of the invention or of a preferred process of the invention, the resultant composite particles in step (a3) are characterized by:
(A) a whiteness W≥65, preferably W≥80, more preferably W≥90, and
(B) a thermal conductivity value at room temperature (20° C.) γR of ≤0.26 W/m*K, preferably ≤0.10 W/m*K, more preferably ≤0.07 W/m*K,
and
(C) an alkali stability, determined as the weight loss in the course of storage in sodium hydroxide solution at pH 14 for 30 days, of ≤9% by mass, preferably ≤8% by mass, more preferably ≤7% by mass, based on composite particles having a grain size in the range of 0.5-1.0 mm (see above for method of determination),
and
(D) a grain strength 1.5 N/mm², preferably 2.0 N/mm², more preferably 4.0 N/mm², determined to DIN EN 13055-1:2008-08, Annex A (Method 1, agitating for 2*30 s with amplitude 0.5), at a grain size in the range of 0.25-0.5 mm (see above for method of determination),
and
(G) a softening temperature ≥900° C., preferably ≥1000° C., more preferably ≥1200° C., determined by heating microscopy (see above for method of determination).

In the context of the present invention, the "thermal conductivity value" is determined in accordance with standard DIN EN 12667:2001-05, "Determination of thermal resistance by means of guarded hot plate and heat flow meter methods (Products of high and medium thermal resistance)".

In the context of the present invention, the "alkali stability" of the composite particles is determined by the following method: 5 g of the composite particles to be examined are weighed out, covered completely with aqueous sodium hydroxide solution (pH 14) and thus left to stand under laboratory conditions (25° C., standard pressure) for 30 days. Subsequently, the composite particles are filtered out of the sodium hydroxide solution, washed to neutrality with water, dried (drying cabinet, 105° C., preferably to constant weight) and weighed. The weight loss after storage in the sodium hydroxide solution in percent compared to the original starting weight of the composite particles is used as a measure of their alkali stability.

In the context of the present invention, "water absorption capacity" is determined by the Enslin method. The method is known to those skilled in the art. It makes use of what is called the "Enslin apparatus" in which a glass suction filter is connected to a graduated pipette via a hose. The pipette is mounted horizontally such that it lies at exactly the same height as the glass frit. A water absorption of 1.5 mL/g thus corresponds to a water absorption of 1.5 mL of water per 1 g of composite particles. The evaluation is to DIN 18132:2012-04.

In the context of the present invention, the "water solubility" of the composite particles is determined by the following method: 5 g of the composite particles to be examined are weighed out and covered completely with water by adding 100 mL aq. dist. and thus left to stand in a closed glass vessel under laboratory conditions (25° C., standard pressure) for 30 days. Subsequently, the composite particles are filtered off, dried (drying cabinet, 105° C., preferably to constant weight) and weighed. The weight loss after storage in water in percent compared to the original starting weight of the composite particles is used as a measure of their water solubility.

In a particularly preferred embodiment of the process of the invention or of a preferred process of the invention, the droplets of a suspension produced in step (a1) comprise, as dispersed phases,
(i) one or more substances selected from the group consisting of
the sheet silicates kaolinite, montmorillonite and illite
and
the clays kaolin and bentonite
in a total amount in the range from 2% to 40% by weight, preferably in the range from 5% to 30% by weight, more preferably in the range from 10% to 20% by weight, based on the total mass of the suspension produced in step (a1),
(ii) additionally one or more density-reducing substances selected from the group consisting of
lightweight fillers having a respective bulk density in the range from 10 to 350 g/L and having a grain size of less than 0.4 mm, more preferably less than 0.3 mm, most preferably less than 0.2 mm, determined by sieving (see above for method of determination), selected from the group consisting of
inorganic hollow beads, preferably of borosilicate glass, organic hollow beads, particles of porous and/or foamed material, preferably porous and/or foamed glass, rice husk ash, core-shell particles and calcined kieselguhr,
blowing agents selected from the group consisting of
carbonates, hydrogencarbonates and oxalates, preferably with cations from the group consisting of alkali metals and alkaline earth metals, preferably calcium carbonates, hydrogencarbonates and oxalates,
vegetable flours selected from the group consisting of coconut shell flour, walnut shell flour, grape seed flour, olive kernel flour, wheat flour, corn flour, wood flour, sunflower husk flour and cork flour,
and
starch, potato dextrin, sugars, plant seeds and rice husk ash and
pyrolyzable fillers selected from the group consisting of
polymer beads
and
styrofoam beads
in a total amount in the range from 2% to 40% by weight, preferably in the range from 5% to 30% by weight, more preferably in the range from 10% to 20% by weight, based on the total mass of the suspension produced in step (a1),
and
(iii) in addition to constituents (i) and (ii), one or more non-refractory solids for reducing the melting point of the composite particles, selected from the group consisting of glass flours, feldspar (preferably albite), boric acid and boron salts, preferably sodium tetraborate and sodium perborate,
in a total amount in the range from 5% to 60% by weight, preferably in the range from 10% to 50% by weight, more preferably in the range from 20% to 40% by weight lies, based on the total mass of the suspension produced in step (a1).

The invention also relates to the use of a matrix encapsulation method, preferably using a nozzle, more preferably using a vibrating nozzle, for production of composite particles having a bulk density of <500 g/L, preferably <400 g/L, more preferably <300 g/L, in the production of an insulating product for the construction materials industry or an insulating material as intermediate for production of such a product.

This aspect of the invention is based, inter alia, on the surprising finding that the use of composite particles prepared in this way that have a bulk density of <500 g/L, preferably <400 g/L, more preferably <300 g/L, results in very lightweight, efficiently insulating insulating products for the construction materials industry or insulating materials as intermediate for production thereof with preferably high alkali stability. With regard to preferred configurations of such a use, the elucidations given for the process of the invention are correspondingly applicable.

The elucidations given for the process of the invention are applicable correspondingly with regard to preferred configurations of an inventive use of a matrix encapsulation method, and vice versa.

In addition, the invention also relates to the use of composite particles producible by means of a matrix encapsulation method as intermediate for production of an insulating product for the construction materials industry or as part of an insulating product for the construction materials industry.

Preference is given here to an inventive use of composite particles producible by means of a matrix encapsulation method, wherein the composite particles are preferably sealed composite particles, each consisting of a composite particle producible by means of a matrix encapsulation method and a shell of an organic coating composition that surrounds and seals the composite particle.

Preference is also given to an inventive use of composite particles producible by means of a matrix encapsulation method (or a corresponding inventive use specified above or hereinafter as preferred), wherein the intermediate is used for production of an insulating product for the construction materials industry or the insulating product for the construction materials industry is used in indoor and outdoor wall and roof linings, preferably fillings, lightweight construction panels in sectors including refurbishment and modernization construction and/or acoustic panels;

indoor and outdoor render systems, preferably thick-layer render systems, preferably in refurbishment renders, render and dry mortar systems, tile adhesives, construction adhesives, leveling compounds, spackling compounds, sealing compounds, filler compounds, wall fillers and/or loam renders;

thin-layer systems, preferably in emulsion paints and/or wallpapers;

and in resin systems for the construction materials industry, preferably in polymer concrete and/or mineral granite, synthetic stone, composite stone and/or ready-made sanitary ware.

The elucidations given in respect of the process of the invention and in respect of the inventive use of a matrix encapsulation method are correspondingly applicable with regard to preferred embodiments of an inventive use of composite particles producible by means of a matrix encapsulation method, and vice versa.

The present invention also further relates to an insulating product for the construction materials industry or an insulation material for production of such a product, comprising a number of composite particles having a grain size of less than 10 mm, preferably less than 2 mm (see above for method of determination), comprising sintered composite of particles of one or more nonrefractory solids, particles of one or more substances selected from the group consisting of sheet silicates and clays that have been embedded into the sintered composite, wherein the insulating product for the construction materials industry or the insulating material for production of such a product is producible by a process as described above (especially a process described above or hereinafter as preferred)

and/or the composite particles are characterized by (D) a grain strength 1.5 N/mm$^2$, preferably 2.0 N/mm$^2$, more preferably ≥4.0 N/mm$^2$, determined to DIN EN 13055-1:2008-08, Annex A (Method 1, agitating for 2*30 s with amplitude 0.5), at a grain size in the range of 0.25-0.5 mm (see above for method of determination), and (E) a water absorption capacity, determined via water absorption according to Enslin, of ≤2.5 mL/g, preferably ≤2.0 mL/g and more preferably ≤1.7 mL/g (see above for method of determination).

Elucidations given in respect of the process of the invention, in respect of the inventive use of composite particles producible by means of a matrix encapsulation method and in respect of the inventive use of a matrix encapsulation method are each correspondingly applicable with regard to preferred embodiments of an insulating product for the construction materials industry or of an insulation material for production of such a product, and vice versa.

If the above-identified insulating product of the invention for the construction materials industry or insulation material for production of such a product comprises particles of one or more substances selected from the group consisting of sheet silicates and clays that have been embedded into the sintered composite and is producible or has been produced by the above-specified process of the invention (especially a process described above or hereinafter as preferred) wherein step (a3) comprises sintering of the hardened droplets, preferably sintering at a temperature in the range from 900 to 980° C., the particles of one or more substances that have been embedded into the sintered composite may either be or comprise the sheet silicates and/or clays originally used in step (a1) or these sheet silicates and/or clays originally used in step (a1) may have given rise entirely or partly to sheet silicates and/or clays transformed by sintering.

For example, it is possible for particular clays—for instance kaolins, e.g. "Chinafill 100" or "Kaolin TEC" from Amberger Kaolinwerke and "Kärlicher Blautonmehl" from Kärlicher Tonand Schamottewerke Mannheim & Co. KG—to have been transformed on thermal treatment in step (a3), even at comparatively low temperatures, to another phase of exceptional thermal stability and hence contribute, inter alia, to better thermal stability of the composite particles produced in processes of the invention. When kaolin is used as clay in step (a3) of the process of the invention, the hardened droplet is preferably heated to a temperature in the range from 900 to 980° C., such that, for example, kaolinite is transformed through intermediate phases to the refractory solid mullite. Such a phase transformation can typically be detected by means of XRD measurement.

Preference is also given to a product of the invention or preferred insulating product of the invention for the construction materials industry or insulation material for production of such a product, wherein the composite particles are additionally characterized by (A) a whiteness W≥65, preferably W≥80, more preferably W≥90 (see above for method of determination).

Preference is also further given to an insulating product of the invention for the construction materials industry or insulation material for production of such a product as described above (especially an insulating product for the construction materials industry or insulation material for production of such a product which is defined above or hereinafter as preferred), wherein the composite particles are additionally characterized by (B) a thermal conductivity value at room temperature (20° C.) γR of ≤0.26 W/m*K, preferably ≤0.10 W/m*K, more preferably ≤0.07 W/m*K (see above for method of determination).

and/or (C) an alkali stability, determined as the weight loss in the course of storage in sodium hydroxide solution at pH 14 for 30 days, of ≤9% by mass, preferably ≤8% by mass, more preferably ≤7% by mass, based on composite particles having a grain size in the range of 0.5-1.0 mm (see above for method of determination), and/or (F) a water solubility, determined as the weight loss in the course of storage in distilled water for 30 days, of ≤2% by mass, preferably ≤1% by mass, more preferably ≤0.2% by mass, based on composite particles having a grain size in the range of 0.5 to 1.0 mm (see above for method of determination), and/or (G) a softening temperature 900° C., preferably 1000° C., more preferably 1200° C., determined by heating microscopy (see above for method of determination).

Preference is also likewise given to an insulating product of the invention for the construction materials industry or insulation material for production of such a product as described above (especially an insulating product for the construction materials industry or insulation material for production of such a product which is defined above or hereinafter as preferred), wherein in the sintered composite of particles of one or more nonrefractory solids the one nonrefractory solid or at least one of the multiple nonrefractory solids is selected from the group consisting of amorphous oxides, amorphous silicates, crystalline oxides and crystalline silicates and mixtures thereof, preferably selected from the group consisting of amorphous silicates and crystalline silicates, and/or (preferably "and")

has a melting point or softening temperature lower than 1350° C.

In many cases, preference is also given to an insulating product of the invention for the construction materials industry or insulation material for production of such a product as described above (especially an insulating product for the construction materials industry or insulation material for production of such a product which is defined above or hereinafter as preferred), wherein the composite particles as coloring agent for white color comprise one or more substances selected from the group consisting of sheet silicates and clays, as particles embedded into the sintered composite, and/or one or more nonrefractory solids, preferably albite, as a constituent of the sintered composite, and/or as additional constituent one or more additional starting materials, preferably selected from the group of the refractory solids, more preferably selected from the group consisting of titanium dioxide, cristobalite and aluminum oxide.

In many cases, preference is also further given to an insulating product of the invention for the construction materials industry or insulation material for production of such a product as described above (especially an insulating product for the construction materials industry or insulation material for production of such a product which is defined above or hereinafter as preferred), wherein the composite particles as coloring agent for white color comprise one or more substances selected from the group consisting of sheet silicates and clays as particles embedded into the sintered composite and/or one or more nonrefractory solids, preferably albite, as a constituent of the sintered composite, and/or as additional constituent one or more additional starting materials, preferably selected from the group of the refractory solids, more preferably selected from the group consisting of titanium dioxide, cristobalite and aluminum oxide.

Preference is also preferably given to an insulating product of the invention for the construction materials industry or insulation material for production of such a product as described above (especially an insulating product for the construction materials industry or insulation material for production of such a product which is defined above or hereinafter as preferred), comprising, as lightweight fillers, organic hollow beads that have been embedded into the sintered composite and have a grain size of less than 0.4 mm, more preferably less than 0.3 mm, most preferably less than 0.2 mm, determined by sieving (see above for method of determination).

Preference is also likewise given to an insulating product of the invention for the construction materials industry or insulation material for production of such a product as described above (especially an insulating product for the construction materials industry or insulation material for production of such a product which is defined above or hereinafter as preferred), comprising particles of one or more substances selected from the group consisting of sheet silicates and clays that have been embedded into the sintered composite, that do not melt in a congruent manner below 1500° C.

and/or that are selected from the group consisting of the sheet silicates kaolinite, montmorillonite and illite, and the clays kaolin and bentonite.

In many cases, preference is also further given to an insulating product of the invention for the construction materials industry or insulation material for production of such a product as described above (especially an insulating product for the construction materials industry or insulation material for production of such a product that has been described above as preferred) comprising a number of composite particles having a grain size of <1.5 mm, preferably a grain size in the range from 0.1 mm to 0.5 mm, more preferably a grain size in the range from 0.1 mm to 0.3 mm, determined by sieving (see above for method of determination).

The present invention is elucidated in detail hereinafter with reference to the figures and by examples.

FIGURES

FIG. 1 shows inventive composite particles C19 after sintering (heating to 950° C. for 30 min., step (a3)). Light micrograph, 200-fold magnification.

As can be seen in FIG. 1, a sintered composite within an (individual) composite particle was formed under the process conditions. Such a sintered composite is one cause of the exceptional mechanical stability of the composite particles of the invention.

FIG. 2 depicts the shape of the sample cube (projection) pressed from the commercial expanded glass Liaver® (see example 2 for more details) before commencement of heating microscopy. The image is characterized by the following corresponding technical data:

18° C./00:00:00//area: 100%/form factor: 0.682//height: 100%/width: 100%//vertex angle on left: 78°/on right: 70°// wetting angle on left: 118°/on right: 84°

FIG. 3 depicts the shape, altered by the effect of temperature, of the sample cube pressed from the commercial expanded glass Liaver® at a temperature of 1250° C. (projection). The image is characterized by the following corresponding technical data: 1250° C./00:23:51.

It is readily apparent that, at a temperature of 1250° C., the original cube shape is lost and the expanded glass has completely melted. This indicates that the commercial expanded glass Liaver® does not have heat resistance to 1250° C.

FIG. 4 depicts the shape of the sample cube (projection) pressed from the commercial foamed glass Forayer® (see example 2 for more details) before commencement of heating microscopy. The image is characterized by the following corresponding technical data:

22° C./00:00:00//area: 100%/form factor: 0.716//height: 100%/width: 100%//vertex angle on left: 82°/on right: 100°//wetting angle on left: 71°/on right: 81°

FIG. 5 depicts the shape, altered by the effect of temperature, of the sample cube pressed from the commercial foamed glass Forayer® at a temperature of 1250° C. (projection). The image is characterized by the following corresponding technical data: 1250° C./00:22:13.

It is readily apparent that, at a temperature of 1250° C., the original cube shape is lost and the foamed glass has completely melted. This indicates that the commercial foamed glass Forayer® does not have heat resistance to 1250° C.

FIG. 6 depicts the shape of the sample cube (projection) pressed from C19 composite particles produced by the process of the invention before commencement of heating microscopy. The image is characterized by the following corresponding technical data:

20° C./00:00:00//area: 100%/form factor: 0.722//height: 100%/width: 100%//vertex angle on left: 95°/on right: 88°// wetting angle on left: 97°/on right: 76°

FIG. 7 depicts the shape of the sample cube (projection) pressed from C19 composite particles produced by the process of the invention at a temperature of 1250° C. The image is characterized by the following corresponding technical data: 1250° C./00:23:49.

It is readily apparent that, at a temperature of 1250° C., the original cube shape has been largely conserved; only the cube dimensions are reduced (sintering). This indicates that C19 composite particles produced by the process of the invention are heat-resistant at least to 1250° C.

EXAMPLES

The present invention is elucidated in detail hereinafter by examples:

Determination and Measurement Methods:

1. Grain Size Determination:

The determination of the grain sizes of composite particles by sieving is effected in accordance with DIN 66165-2 (4.1987) using Method F specified therein (machine sieving with moving individual sieve or sieve set in gaseous static fluid). A vibratory sieving machine of the RETSCH AS 200 control type is used; the amplitude is set here to level 2; there is no interval sieving; the sieving time is 1 minute.

The determination of the grain sizes of lightweight fillers used in step (a) as density-reducing substance of component (ii) is likewise effected in accordance with DIN 66165-2 (4.1987) using Method F specified therein (machine sieving with moving individual sieve or sieve set in gaseous static fluid). A vibratory sieving machine of the RETSCH AS 200 control type is likewise used; the amplitude is set here to level 2; there is no interval sieving; the sieving time is 1 minute.

The determination of the grain sizes of refractory solids having a grain size of less than 0.1 mm is effected by sieving to DIN 66165-2 (4.1987) using Method D specified therein (machine sieving with a static individual sieve in gaseous moving fluid, with air jet sieve).

2. Determination of Bulk Density:

The bulk density of each of the samples was determined to DIN EN ISO 60 2000-1.

3. Determination of Water Absorption Capacity:

The determination of the water absorption capacity of the samples was determined by the Enslin method by means of an "Enslin apparatus". A glass suction filter is connected here via a hose to a graduated pipette. The pipette was mounted horizontally such that it lay at exactly the same height as the glass frit. A water absorption of 1.5 mL/g thus corresponds to a water absorption of 1.5 mL of water per 1 g of composite particles. The evaluation was to DIN 18132: 2012-04.

4. Determination of Chemical Composition and Morphology:

The morphology was determined using a VisiScope ZTL 350 light microscope with a Visicam 3.0 camera.

5. Determination of Whiteness

The whiteness was determined by the Tappi method (R457 whiteness), measured with a Minolta CM-2600 d spectrometer (see details from the manufacturer at its website at the address: https://www.konicaminolta.eu/de/messgeraete/produkte/farbmessung-glanzmessund/spektralphotometer-portabel/cm-2600 d-cm-2500d/technische-daten.html) with the following settings: mask average (MAV); measurement with and without specular component (SCI+SCE) and 0% UV component. The measurements are read out with the following specifications: standard illuminant C, observer angle 2° (C-2), without specular component and with 0% UV (SCE/0). The following "L*a*b values" are used: D65-10, SCI/0 (standard illuminant D65, observer angle 10° (D65-10) including specular component and 0% UV (SCI/0).

6. Determination of Thermal Conductivity Value

The thermal conductivity values of the samples were determined in accordance with standard DIN EN 12667: 2001-05, "Determination of thermal resistance by means of guarded hot plate and heat flow meter methods (Products of high and medium thermal resistance)".

7. Determination of Alkali Stability

The alkali stability of the samples (composite particles) was determined by the following method: 5 g of the composite particles to be examined were weighed out, covered completely with aqueous sodium hydroxide solution (pH 14) and thus left to stand under laboratory conditions (25° C., standard pressure) for 30 days. Subsequently, the composite particles were filtered out of the sodium hydroxide solution, washed to neutrality with water, dried (drying cabinet, 105° C.) and weighed. The weight loss after storage in the sodium hydroxide solution compared to the original starting weight of the composite particles was used as a measure of their alkali stability.

8. Determination of Water Solubility

The water solubility of the samples (composite particles) was determined by the following method: 5 g of the composite particles to be examined were weighed out and covered completely with water by adding 100 mL aq. dist. and thus left to stand in a closed glass vessel under laboratory conditions (25° C., standard pressure) for 30 days. Subsequently, the composite particles were filtered off, dried (drying cabinet, 105° C.) and weighed. The weight loss after storage in water compared to the original starting weight of the composite particles was used as a measure of their water solubility.

9. Determination of the Softening Temperature of Composite Particles of the Invention The softening temperature of the samples was preferably determined by heating microscopy with an EM 301 (model M17) heating microscope from Hesse Instruments, Germany (see the relevant details on the website at the following address: http://www.hesse-instruments.de/content/products.php?Hllang=de) with selection of the following measurement conditions: 1st heating rate: 80 K/min until attainment of 700° C. (no hold time); 2nd heating rate: 50 K/min until attainment of 1500° C. (no hold time) and 3rd heating rate at 10 K/min until attainment of 1650° C. (hold time 5 s). The time of attainment of the softening temperature was determined to standard DIN 51730 (1998-4) (or ISO 540:1995-03).

Example 1: Production of Composite Particles by the Process of the Invention

By step (a) of the process of the invention, composite particles (C01, C17, C19, C23, C27, C29 and C30) were produced with a grain size of less than 10 mm, preferably less than 2 mm (also referred to hereinafter as "composite particles of the invention"):

(a1) Producing Droplets of a Suspension of Starting Materials:

A 1% aqueous sodium alginate solution was produced (1% by weight of sodium alginate from Alpichem with CAS No. 9005-38-3, based on the total mass of the aqueous solution).

The Sokalan® FTCP 5 dispersant from BASF was diluted with water to prepare a corresponding dispersion solution; the mass ratio of Sokalan® FTCP 5 to water was 1:2.

The 1% aqueous sodium alginate solution prepared and the dispersion solution prepared were subsequently mixed in a mixing ratio according to table 1a or 1b, so as to give a solidifiable liquid (solidifiable liquid for use as continuous phase in the sense of constituent (iv) in step (a1)).

While stirring, sheet silicates and/or clays (constituent (i) in step (a1)) and nonrefractory solids (constituent (iii) in step (a1)) selected according to table 1a or 1b below were then added to the solidifiable liquid until a creamy suspension was formed.

While continuing to stir, density-reducing substances (constituent (ii) in step (a1), lightweight fillers, blowing agents or pyrolyzable substances, each according to table 1a or 1b) were then added in an amount according to table 1 below to the creamy suspension, followed by an amount of water according to table 1a or 1b.

The result in each case was a diluted suspension.

TABLE 1a

Ingredients for production of composite particles of the invention and bulk densities resulting therefrom

| Starting material | | Ingredients | | Composition of the suspension (parts by weight) | | | |
|---|---|---|---|---|---|---|---|
| | | Constituent | Manufacturer | | | | |
| Sheet silicate or clay [% by wt.] | (i) | Kaolin Satintone ® W; CAS RN 92704-41-1 | BASF | 15.5 | 15.5 | 10.6 | 10.6 |
| | (i) | Bentonit Volclay ® CAS RN 1302-78-9 | Clariant | 3.1 | 3.1 | — | — |
| Nonrefractory solid | (iii) | Albit 45 (feldspar) CAS RN 68476-25-5 | Ziegler & Co. GmbH | — | — | 10.6 | 10.6 |
| | (iii) | Poraver flour (glass flour) CAS RN 65997-17-3 | Dennert Poraver GmbH | 15.5 | 15.5 | 14.2 | 16.0 |
| | (iii) | Flat glass flour DIN 100, CASRN65997-17-3 | | — | — | — | — |
| Lightweight filler [% by wt.] | (ii) | Borosilicate glass beads CAS RN 65997-17-3 and 7631-86-9 | 3M Deutschland GmbH | 0.5 | — | — | — |
| Pyrolyzable filler [% by wt.] | (ii) | Polymer beads PM 6550 | Kish Company Inc. | — | — | — | — |
| | (ii) | Polymer beads Expancel ® 920 DE 80 CAS RN 38742-70-0 | Akzo Nobel | — | 0.5 | 0.8 | 0.8 |
| 1% sodium alginate solution [% by wt.] | (iv) | Sodium alginate; CAS: 9005-38-3 | Applichem | 45.5 | 45.5 | 46.7 | 46.7 |

TABLE 1a-continued

Ingredients for production of composite particles of the invention and bulk densities resulting therefrom

| Starting material | Ingredients | | | Composition of the suspension (parts by weight) | | | |
|---|---|---|---|---|---|---|---|
| | Constituent | | Manufacturer | | | | |
| Dispersion solution [% by wt.] | (iv) | Sokalan ® FT CP5 in water (1.2) | BASF | 2.8 | 1.8 | 1.9 | 1.9 |
| Water [% by wt.] | | | | 18.2 | 18.2 | 14.3 | 12.5 |
| Resulting composite particles of the invention | | | | C01 | C17 | C19 | C23 |
| Resulting bulk density [g/L], based on grain sizes 0-1.5 mm | | | | 430 | 420 | 340 | 370 |

TABLE 1b

Ingredients for production of composite particles of the invention and bulk density resulting therefrom (continuation of table 1a)

| Starting material | Ingredients | | | Composition of the suspension (parts by weight) | | |
|---|---|---|---|---|---|---|
| | | Constituent | Manufacturer | | | |
| Sheet silicate or clay [% by wt.] | (i) | Kaolin Satintone ® W; CAS RN 92704-41-1 | BASF | 10.6 | 10.0 | 10.5 |
| | (i) | Bentonit Volclay ® CAS RN 1302-78-9 | Clariant | — | — | — |
| Nonrefractory solid | (iii) | Albit 45 (feldspar) CAS RN 68476-25-5 | Ziegler & Co. GmbH | 10.6 | 10.0 | 10.5 |
| | (iii) | Poraver flour (glass flour) CAS RN 65997-17-3 | Dennert Poraver GmbH | 14.2 | — | — |
| | (iii) | Flat glass flour DIN 100, CAS RN65997-17-3 | | — | 20.0 | 18.0 |
| Lightweight filler [% by wt.] | (ii) | Borosilicate glass beads CAS RN 65997-17-3 and 7631-86-9 | 3M Deutschland GmbH | — | — | — |
| Pyrolyzable filler [% by wt.] | (ii) | Polymer beads PM 6550 | Kish Company Inc. | 0.8 | 0.8 | 0.8 |
| | (ii) | Polymer beads Expancel ® 920 DE 80 CAS RN 38742-70-0 | Akzo Nobel | — | — | — |
| 1% sodium alginate solution [% by wt.] | (iv) | Sodium alginate; CAS: 9005-38-3 | Applichem | 46.7 | 45.0 | 45.0 |
| Dispersion solution [% by wt.] | (iv) | Sokalan ® FT CP5 in water (1.2) | BASF | 1.9 | 1.9 | 1.9 |
| Water [% by wt.] | | | | 14.3 | 12.3 | 13.3 |
| Resulting composite particles of the invention | | | | C27 | C29 | C30 |
| Resulting bulk density [g/L], based on grain sizes 0-1.5 mm | | | | 360 | 460 | 415 |

Further details of the ingredients in table 1a and 1b (see above for the respective methods of determining the parameters):

Kaolin Satintone® W: "Whitetex", bulk density 500 g/L; D50=1.4 μm (manufacturer's figure)

Bentonit Volclay®: bulk density 800-950 g/L; D50=4 μm (manufacturer's figure)

Albit 45: D50=7 μm; whiteness R457 91.9% (manufacturer's figures)

Poraver flour (glass flour): D50=45 μm (manufacturer's figure)

Flat glass flour DIN 100: from ground flat glass shards, bulk density 1.2 g/L; whiteness R457 89%. The identifier "DIN 100" means that the flat glass flour is in the ground state, and the sieving of a sample of this constituent with an analytical sieve having a nominal mesh size of 100 μm (to DIN ISO 3310-1:2001-09) leaves a residue in the range from 1% to 10% by weight, based on the amount of sample used.

Borosilicate glass beads: Product name: "3M Glass Bubbles K1"; bulk density of 125 g/L Polymer beads PM 6550 Sphere One Extendospheres®, bulk density of 50 g/L; grain size: 10-200 μm Polymer beads Expancel® 920 DE 80: bulk density of 27-33 g/L; D50=55-85 μm (manufacturer's figure)

(a2) Solidifying the Solidifiable Liquid

The diluted suspension was introduced in each case into plastic syringes and clamped into a syringe pump (LA-30 type). The feed rate was 12 to 15 mL/min. The diluted suspension in the syringes was then forced through a vibration nozzle, such that the diluted suspension dripped out of the vibration nozzle in uniform droplets. The droplets that dripped out of the vibration nozzle fell into an about 2% aqueous calcium chloride solution ($CaCl_2$), product name "Calcium Chloride 2-hydrate powder for analysis ACS" from Applichem, CAS No. 10035-04-8, 2% by weight based on the total mass of the calcium chloride solution) and solidified, such that they hardened to give hardened droplets and the "sheet silicates or clays", the "nonrefractory solids", the "pyrolyzable fillers" and the "lightweight fillers" (according to table 1a or 1b) were encapsulated in the solidifying mixture (consisting of the 1% sodium alginate solution and the dispersion solution).

Note: The size of the hardened droplets was dependent on the composition of the diluted suspension, the delivery rate of the pump and the vibration frequency of the nozzle.

(a3) Treating the Hardened Droplets

Subsequently, the hardened droplets were skimmed off and washed in water.

Thereafter, the washed and hardened droplets were dried in a drying cabinet at 180° C. for 40 min. After the drying, the hardened droplets were free-flowing.

Thereafter, the free-flowing hardened droplets were heated in a preheated muffle furnace at 950° C. for 30 minutes. The cooling resulted in composite particles produced in accordance with the invention with the bulk densities reported in table 1a or 1b.

The composite particles produced in this way are excellent insulation materials of excellent suitability as intermediates for production of insulating products for the construction materials industry.

As can be inferred from the last line of tables 1a and 1b, the measured bulk densities of the composite particles of the invention produced are below 500 g/L. By a suitable choice of the sheet silicates or clays, the nonrefractory solids and the density-reducing substances, it is possible to reduce the bulk density of resultant composite particles of the invention even down to below 350 g/L (cf. composite particles C19 in table 1a).

Example 2: Determination of Alkali Stability

The alkali stabilities of composite particles produced in accordance with the invention as per example 1 and of prior art comparative materials of inorganic fillers or insulation materials were determined by the above-specified determination method No. 7. The results of these determinations are listed in table 2. Inventive composite particles "019" (cf. table 1a) were used.

Comparative materials used were the following commercial materials:
Liaver® expanded glass sintered, bulk density 250 g/L, grain size 0.5-1.0 mm
Forayer® foamed glass, bulk density 270 g/L, grain size 0.5-1.0 mm
Aerosilex® foamed glass (glass and siliceous earth), bulk density 125 g/L, grain size 0.5-1.0 mm

TABLE 2

Determination of alkali stabilities of composite particles of the invention and comparative materials

| Sample | Loss of mass [%] |
| --- | --- |
| C19 composite particles of the invention | 6 |
| Liaver ® comparative material | 7 |
| Poraver ® comparative material | 10 |
| Aerosilex ® comparative material | 100 |

It can be seen from the results in table 2 that the composite particles of the invention examined had the highest alkali resistance (the lowest loss of mass) of all samples of inorganic fillers examined.

Example 3: Determination of Water Absorption Capacity

Water absorption capacities of composite particles produced in accordance with the invention as per example 1 and of prior art comparative materials of inorganic fillers or insulation materials were determined by the above-specified determination method No. 3. The results of these determinations are listed in table 3. Inventive composite particles "C19" (cf. table 1a) were used.

Comparative materials used were the commercial materials Liaver® expanded glass and Forayer® foamed glass specified above in example 2.

TABLE 3

Determination of water absorption capacities of composite particles of the invention and comparative materials

| Sample | Water absorption [mL/g] |
| --- | --- |
| C19 composite particles of the invention | 1.5 |
| Liaver ® comparative material | 1.5 |
| Poraver ® comparative material | 1.5 |

It can be seen from the results in table 3 that the composite particles of the invention examined show a water absorption capacity in the region of the expanded and foamed glasses having low water absorption capacity.

Example 4: Determination of Softening Temperatures

The softening temperature of each of the composite particles produced in accordance with the invention as per example 1 and of prior art comparative materials of inorganic fillers or insulation materials was determined by the above-specified determination method No. 9.

The results of these determinations are listed in table 4. Inventive composite particles "C19" (cf. table 1a) were used.

Comparative materials used were the commercial materials Liaver® expanded glass and Forayer® foamed glass specified above in example 2.

TABLE 4

Determination of softening temperature in inventive composite particles produced and comparative materials

| Measurement | C19 composite particles of the invention | Liaver ® comparative material | Poraver ® comparative material |
| --- | --- | --- | --- |
| Softening temperature [° C.] | 1250 | 741 | 753 |

It can be seen from the results in table 4 that the the composite particles produced in accordance with the invention that have been examined have a much higher softening temperature than the samples of prior art comparative materials of inorganic fillers or insulation materials that have been examined. This suggests significantly better thermal stability of the composite particles produced in accordance with the invention compared to the commercial inorganic fillers or insulation materials examined.

The results of the determination of softening temperatures are also shown in graph form in FIGS. 2 to 7. For this purpose, the samples to be examined in each case were crushed with a mortar and pestle to give powders and mixed with a little ethanol. By means of a compression mold, cubes were then pressed from the samples thus prepared, which were examined as specified above by means of heating microscopy. The changes in shape of samples during the heating operation were recorded by photography in each case.

The invention is summarized in aspects 1 to 31 specified below:

1. A process for producing an insulating product for the construction materials industry or an insulating material as intermediate for production of such a product, having the following steps:
   (a) producing composite particles having a grain size of less than 10 mm, preferably less than 2 mm, determined by sieving, in a matrix encapsulation process having the following steps:
      (a1) producing droplets of a suspension composed of at least the following starting materials:
         as dispersed phases
            (i) one or more substances selected from the group consisting of sheet silicates and clays,
            (ii) additionally one or more density-reducing substances selected from the group consisting of lightweight fillers having a respective bulk density in the range from 10 to 350 g/L, blowing agents and pyrolyzable fillers
         and
            (iii) one or more nonrefractory solids for reducing the melting point of the composite particles in addition to constituents (i) and (ii),
         and as continuous phase
            (iv) a solidifiable liquid,
      (a2) solidifying the solidifiable liquid, such that the droplets harden to give hardened droplets, and
         the (i) substance(s) selected from the group consisting of sheet silicates and clays,
         the (ii) density-reducing substance(s) and
         the (iii) nonrefractory solid(s)
      are encapsulated in the solidifying continuous phase,
      (a3) treating the hardened droplets so as to result in said composite particles, the treating comprising a sintering of the hardened droplets.

2. The process according to aspect 1, wherein the one or more nonrefractory solids for reducing the melting point of the composite particles that are used as additional starting material (iii) are inorganic materials
   selected from the group consisting of amorphous oxides, amorphous silicates, crystalline oxides and crystalline silicates and mixtures thereof, preferably selected from the group consisting of amorphous silicates and crystalline silicates,
   and/or (preferably "and")
   having a melting point or softening temperature lower than 1350° C.

3. The process according to either of the preceding aspects, wherein the one or more nonrefractory solids for reducing the melting point of the composite particles that are used as additional starting material (iii) are selected from the group consisting of glass flours, feldspar, boric acid and boron salts such as sodium tetraborate and sodium perborate,
   where the one nonrefractory solid or at least one of the multiple nonrefractory solids for reducing the melting point of the composite particles is preferably selected from the group consisting of glass flours and albite,
      more preferably
      selected from the group consisting of the glass flours having a whiteness >80
      and/or
      selected from the group of the recycled glass flours.

4. The process according to any of the preceding aspects, wherein the coloring agent used for white color in step (a1)
   in constituent (i) is one or more substances selected from the group consisting of sheet silicates and clays,
   and/or
   in constituent (iii) is one or more nonrefractory solids for reducing the melting point of the composite particles, preferably glass flours and/or albite,
   and/or
   an additional constituent used is one or more additional starting materials, preferably selected from the group of the refractory solids, more preferably selected from the group consisting of titanium dioxide, cristobalite, aluminum oxide.

5. The process according to any of the preceding aspects, wherein
   in step (a1) droplets are provided by means of one or more nozzles, preferably vibration nozzles,
   and/or
   in step (a2) the solidifying of the solidifiable liquid is induced by cooling, drying or chemical reaction.

6. The process according to either of the preceding aspects, wherein the solidifiable liquid used in step (a1) is a liquid solidifiable by chemical reaction and the solidifying of the solidifiable liquid in step (a2) is induced by chemical reaction.

7. The process according to any of the preceding aspects, wherein the solidifiable liquid is a liquid solidifiable by cation exchange reaction, preferably a liquid solidifiable by reaction with calcium ions and/or barium ions and/or manganese ions, preferably by reaction with calcium ions.

8. The process according to any of the preceding aspects, wherein the solidifiable liquid is a liquid solidifiable by reaction with calcium ions,
   comprising one or more binders selected from the group consisting of alginate, PVA, chitosan and sulfoxyethyl cellulose,
   and/or
   an aqueous solution,
   wherein the solidifiable liquid is preferably an aqueous alginate solution.

9. The process according to any of the preceding aspects, wherein
   the or at least one of the lightweight fillers used in step (a) as density-reducing substance of component (ii), preferably having a grain size of less than 0.4 mm, more preferably less than 0.3 mm, most preferably less than 0.2 mm, determined by sieving, is selected from the group consisting of:
      inorganic hollow beads, preferably of borosilicate glass, organic hollow beads, particles of porous and/or foamed material, rice husk ash, core-shell particles and calcined kieselguhr
      and/or
   wherein the or at least one of the blowing agents used in step (a) as component (ii) is selected from the group consisting of:
      carbonates, hydrogencarbonates and oxalates
      vegetable flours, preferably selected from the group consisting of coconut shell flour, walnut shell flour, grape seed flour, olive kernel flour, wheat flour, corn flour, wood flour, sunflower husk flour and cork flour,
starch,
potato dextrin,
sugars,
plant seeds,
and
rice husk ash,
and/or
wherein the or at least one of the pyrolyzable fillers used in step (a) as component (ii) is selected from the group consisting of:
polymer beads
and
styrofoam beads.

10. The process according to any of the preceding aspects, wherein
one or more refractory solids are used in step (a1) as additional starting material for production of a further dispersed phase,
preferably in a proportion of not more than 10% by weight, based on the total amount of the solid constituents of the suspension produced in step (a1),
wherein the or at least one of the refractory solids used additionally in step (a1) is preferably selected from the group consisting of:
oxides of one or more elements from the group consisting of Si, Al, Zr, Ti, Mg and Ca,
and
mixed oxides each comprising one or more elements from the group consisting of Si, Al, Zr, Ti, Mg and Ca,
wherein the proportion of the total amount of the constituents from this group is preferably not more than 10% by weight, based on the total amount of the solid constituents of the suspension produced in step (a1),
wherein the or at least one of the refractory solids used additionally in step (a1) is preferably selected from the group consisting of:
aluminum oxide,
zirconium oxide,
titanium dioxide,
silicon dioxide,
magnesium oxide,
calcium oxide,
calcium silicate,
sheet silicates, preferably mica,
aluminum silicates,
and
magnesium aluminum silicate, preferably cordierite,
wherein the proportion of the total amount of the constituents from this group is preferably not more than 10% by weight, based on the total amount of the solid constituents of the suspension produced in step (a1).

11. The process according to any of the preceding aspects, wherein the or at least one of the substance(s) used in step (a1) as substance of component (i)
is selected from the group consisting of sheet silicates and clays that do not melt in an incongruent manner below 1500° C.
and/or
is selected from the group consisting of
the sheet silicates kaolinite, montmorillonite and illite,
and
the clays kaolin and bentonite.

12. The process according to any of the preceding aspects, wherein the treating in step (a3) is conducted in such a way that the bulk density of the resultant composite particles in step (a3) is lower than the bulk density of the hardened droplets in the dried state
and/or
said resultant composite particles in step (a3) have a bulk density <500 g/L, preferably <400 g/L, more preferably <300 g/L.

13. The process according to any of the preceding aspects, wherein all or some of the resultant composite particles in step (a3) have a grain size of <1.5 mm, preferably at least some have a grain size in the range from 0.1 mm to 0.5 mm and more preferably at least some have a grain size in the range from 0.1 mm to 0.3 mm, determined by sieving.

14. The process according to any of the preceding aspects, wherein component (ii) comprises, as density-reducing substance(s),
one or more blowing agents and the treating in step (a3) is conducted in such a way that the one or more blowing agents expand and hence form cavities in the resultant composite particle
and/or
one or more pyrolyzable fillers and the treating in step (a3) is conducted in such a way that the one or more pyrolyzable fillers pyrolyze and hence form cavities in the resultant composite particle.

15. The process according to any of the preceding aspects, wherein component (i) in step (a1) comprises at least one clay, preferably containing kaolinite and/or illite,
and/or
wherein the treating in step (a3) comprises sintering at a temperature in the range from 900 to 980° C., preferably forming a sintered composite comprising components (i), (ii) and (iii).

16. The process according to any of the preceding aspects, wherein the sintering in step (a3) does not exceed a temperature of 1000° C.

17. The process according to any of the preceding aspects, wherein the hardened droplets are sintered in step (a3) so as to result in solid particles as intermediate, and wherein the surface of these solid particles is subsequently sealed, preferably by means of an organic coating composition, so as to result in said composite particles.

18. The process according to any of the preceding aspects, wherein the resultant composite particles in step (a3) are characterized by
(A) a whiteness W≥65, preferably W≥80, more preferably W≥90,
and/or
(B) a thermal conductivity value at room temperature (20° C.) γR of ≤0.26 W/m*K, preferably ≤0.10 W/m*K, more preferably ≤0.07 W/m*K,
and/or
(C) an alkali stability, determined as the weight loss in the course of storage in sodium hydroxide solution at pH 14 for 30 days, of ≤9% by mass, preferably ≤8% by mass, more preferably ≤7% by mass, based on composite particles having a grain size in the range of 0.5-1.0 mm,
and/or
(D) a grain strength ≥1.5 N/mm2, preferably ≥2.0 N/mm2, more preferably ≥4.0 N/mm2, determined to DIN EN 13055-1:2008-08, Annex A (Method 1, agitating for 2*30 s with amplitude 0.5), at a grain size in the range of 0.25-0.5 mm,
and/or
(E) a water absorption capacity, determined via water absorption according to Enslin, of ≤2.5 mL/g, preferably ≤2.0 mL/g and more preferably ≤1.7 mL/g,
and/or
(F) a water solubility, determined as the weight loss in the course of storage in distilled water for 30 days, of ≤2% by mass, preferably ≤1% by mass, more preferably ≤0.2% by mass, based on composite particles having a grain size in the range of 0.5 to 1.0 mm, and/or (G) a softening temperature 900° C., preferably 1000° C., more preferably 1200° C., determined by heating microscopy.

19. The use of a matrix encapsulation method, preferably using a nozzle, more preferably using a vibrating nozzle, for production of composite particles having a bulk density of <500 g/L, preferably <400 g/L, more preferably <300 g/L, in the production of an insulating product for the construction materials industry or an insulating material as intermediate for production of such a product.

20. The use of composite particles producible by means of a matrix encapsulation method as intermediate for production of an insulating product for the construction materials industry or as part of an insulating product for the construction materials industry, 21. The use according to aspect 20, wherein the composite particles are sealed composite particles, each consisting of a composite particle producible by means of a matrix encapsulation method and a shell of an organic coating composition that surrounds and seals the composite particle, 22. The use according to any of aspects 19 to 21, wherein the intermediate for production of an insulating product for the construction materials industry or the insulating product for the construction materials industry is used in
    indoor and outdoor wall and roof linings,
    indoor and outdoor thick-layer render systems,
    thin-layer systems
    and in
    resin systems for the construction materials industry.

23. An insulating product for the construction materials industry or insulating material for production of such a product, comprising a number of composite particles having a grain size of less than 10 mm, comprising
    sintered composite of particles of one or more nonrefractory solids,
    particles of one or more substances selected from the group consisting of sheet silicates and clays that have been embedded into the sintered composite,
    wherein
    the insulating product for the construction materials industry or the insulating material for production of such a product is producible by a process according to any of aspects 1 to 18
    and/or
    the composite particles are characterized by
    (D) a grain strength 1.5 N/mm2, preferably ≥2.0 N/mm2, more preferably ≥4.0 N/mm2, determined to DIN EN 13055-1:2008-08, Annex A (Method 1, agitating for 2*30 s with amplitude 0.5), at a grain size in the range of 0.25-0.5 mm,
    and
    (E) a water absorption capacity, determined via water absorption according to Enslin, of ≤2.5 mL/g, preferably ≤2.0 mL/g and more preferably ≤1.7 mL/g.

24. The insulating product for the construction materials industry or insulating material for production of such a product according to aspect 23,
    wherein the composite particles are additionally characterized by
    (A) a whiteness W≥65, preferably W≥80, more preferably W≥90.

25. The insulating product for the construction materials industry or insulating material for production of such a product according to aspect 23 or 24,
    wherein the composite particles are additionally characterized by
    (B) a thermal conductivity value at room temperature (20° C.) γR of ≤0.26 W/m*K, preferably ≤0.10 W/m*K, more preferably ≤0.07 W/m*K,
    and/or
    (C) an alkali stability, determined as the weight loss in the course of storage in sodium hydroxide solution at pH 14 for 30 days, of ≤9% by mass, preferably ≤8% by mass, more preferably ≤7% by mass, based on composite particles having a grain size in the range of 0.5-1.0 mm,
    and/or
    (F) a water solubility, determined as the weight loss in the course of storage in distilled water for 30 days, of ≤2% by mass, preferably ≤1% by mass, more preferably ≤0.2% by mass, based on composite particles having a grain size in the range of 0.5 to 1.0 mm,
    and/or
    (G) a softening temperature 900° C., preferably 1000° C., more preferably 1200° C., determined by heating microscopy.

26. The insulating product for the construction materials industry or insulating material for production of such a product according to any of aspects 23 to 25, wherein
    in the sintered composite of particles of one or more nonrefractory solids the one nonrefractory solid or at least one of the multiple nonrefractory solids
    is selected from the group consisting of amorphous oxides, amorphous silicates, crystalline oxides and crystalline silicates and mixtures thereof, preferably selected from the group consisting of amorphous silicates and crystalline silicates,
    and/or
    has a melting point or softening temperature lower than 1350° C.

27. The insulating product for the construction materials industry or insulating material for production of such a product according to any of aspects 23 to 26, wherein
    in the sintered composite of particles of one or more nonrefractory solids the one nonrefractory solid or at least one of the multiple nonrefractory solids
    is selected from the group consisting of glass flours, feldspar, boric acid and boron salts, such as sodium tetraborate and sodium perborate,
    where the one nonrefractory solid or at least one of the multiple nonrefractory solids is preferably selected from the group consisting of glass flours and albite,
    more preferably
    selected from the group consisting of the glass flours having a whiteness >80
    and/or
    selected from the group of the recycled glass flours.

28. The insulating product for the construction materials industry or insulating material for production of such a product according to any of aspects 23 to 27, wherein the composite particles comprise as coloring agent for white color
    one or more substances selected from the group consisting of sheet silicates and clays as particles embedded into the sintered composite
    and/or
    one or more nonrefractory solids, preferably albite, as a constituent of the sintered composite,
    and/or
    as additional constituent one or more additional starting materials, preferably selected from the group of the refractory solids, more preferably selected from the group consisting of titanium dioxide, cristobalite and aluminum oxide.

29. The insulating product for the construction materials industry or insulating material for production of such a product according to any of aspects 23 to 28,
comprising, as lightweight fillers, organic hollow beads that have been embedded into the sintered composite and have a grain size of less than 0.4 mm, more preferably less than 0.3 mm, most preferably less than 0.2 mm, determined by sieving, 30. The insulating product for the construction materials industry or insulating material for production of such a product according to any of aspects 23 to 29, comprising particles of one or more substances selected from the group consisting of sheet silicates and clays that have been embedded into the sintered composite,
that do not melt in a congruent manner below 1500° C. and/or
are selected from the group consisting of
the sheet silicates kaolinite, montmorillonite and illite, and
the clays kaolin and bentonite.

31. The insulating product for the construction materials industry or insulation material for production of such a product according to any of aspects 23 to 30, comprising a number of composite particles having a grain size of <1.5 mm, preferably a grain size in the range from 0.1 mm to 0.5 mm, more preferably a grain size in the range from 0.1 mm to 0.3 mm, determined by sieving.

The invention claimed is:

1. A process for producing fireproofing material, a thermal or sound insulating product, or an insulating material as intermediate for production of such a product, the method comprising the following steps:
   (a) producing composite particles having a grain size of less than 10 mm, determined by sieving, in a matrix encapsulation process having the following steps:
      (a1) producing droplets of a suspension composed of at least the following starting materials:
      as dispersed phases
         (i) one or more substances selected from the group consisting of sheet silicates and clays,
         (ii) additionally one or more density-reducing substances selected from the group consisting of lightweight fillers having a respective bulk density in the range from 10 to 350 g/L, blowing agents and pyrolyzable fillers and
         (iii) one or more nonrefractory solids for reducing the melting point of the composite particles in addition to constituents (i) and (ii),
      and as continuous phase
         (iv) a solidifiable liquid,
      (a2) solidifying the solidifiable liquid, such that the droplets harden to give hardened droplets, and
      the (i) substance(s) selected from the group consisting of sheet silicates and clays,
      the (ii) density-reducing substance(s) and
      the (iii) nonrefractory solid(s)
      are encapsulated in the solidifying continuous phase,
      (a3) treating the hardened droplets so as to result in said composite particles, the treating comprising a sintering of the hardened droplets,
      wherein the composite particles produced in step (a3) comprise a continuous solid phase that extends from center to outer surface of the composite particle; and
   (b) producing the fireproofing material, thermal or sound insulating product, or the insulating material as intermediate for production of such a product using the composite particles from step (a).

2. The process as claimed in claim 1, wherein the one or more nonrefractory solids for reducing the melting point of the composite particles that are used as additional starting material (iii) are inorganic materials selected from the group consisting of amorphous oxides, amorphous silicates, crystalline oxides and crystalline silicates and mixtures thereof, and/or
having a melting point or softening temperature lower than 1350° C., and/or
selected from the group consisting of glass flours, feldspar, boric acid and boron salts.

3. The process as claimed in claim 1, wherein the one or more nonrefractory solids for reducing the melting point of the composite particles that are used as additional starting material (iii) are inorganic materials
selected from the group consisting of amorphous oxides, amorphous silicates, crystalline oxides and crystalline silicates and mixtures thereof,
and
having a melting point or softening temperature lower than 1350° C.,
and/or
selected from the group consisting of glass flours, feldspar, boric acid and boron salts.

4. The process as claimed in claim 1 wherein the insulating product produced for the construction materials industry or the insulation material produced as intermediate for production of such a product is selected from the group consisting of:
indoor and outdoor wall and roof linings, construction panels, and/or acoustic panels;
indoor and outdoor render systems, render and drying mortar systems, tile adhesives, construction adhesives, leveling compounds, spackling compounds, sealing compounds, filling compounds, wall fillers and/or loam renders;
emulsion paints and/or wallpapers,
and
resin systems for the construction materials industry.

5. The process as claimed in claim 1, wherein step (a1) further comprises adding a coloring agent for white color, wherein at least one of the following is true:
the coloring agent is in constituent (i) and the coloring agent is one or more substances selected from the group consisting of sheet silicates and clays;
the coloring agent is in constituent (iii) and the coloring agent is one or more nonrefractory solids for reducing the melting point of the composite particles;
the coloring agent is an additional constituent used as one or more additional starting materials.

6. The process as claimed in claim 1, wherein the or at least one of the lightweight fillers used in step (a) as density-reducing substance of component (ii) is selected from the group consisting of:
inorganic hollow beads, organic hollow beads, particles of porous and/or foamed material, rice husk ash, core-shell particles and calcined kieselguhr, and/or
wherein the or at least one of the blowing agents used in step (a) as component (ii) is selected from the group consisting of:
carbonates, hydrogencarbonates, oxalates,
vegetable flours, selected from the group consisting of coconut shell flour, walnut shell flour, grape seed flour, olive kernel flour, wheat flour, corn flour, wood flour, sunflower husk flour and cork flour,
starch,
potato dextrin,
sugars,
plant seeds,
and
rice husk ash, and/or
wherein the or at least one of the pyrolyzable fillers used in step (a) as component (ii) is selected from the group consisting of:
polymer beads
and
styrofoam beads.

7. The process as claimed in claim 6, wherein the or at least one of the lightweight fillers used in step (a) as density-reducing substance of component (ii) has a grain size of less than 0.4 mm determined by sieving.

8. The process as claimed in claim 1, wherein
one or more refractory solids are used in step (a1) as additional starting material for production of a further dispersed phase,
wherein the or at least one of the refractory solids used additionally in step (a1) is selected from the group consisting of:
oxides of one or more elements from the group consisting of Si, Al, Zr, Ti, Mg and Ca, and
mixed oxides each comprising one or more elements from the group consisting of Si, Al, Zr, Ti, Mg and Ca.

9. The process as claimed in claim 8, wherein at least one of the refractory solids used additionally in step (a1) is selected from the group consisting of:
aluminum oxide,
zirconium oxide,
titanium dioxide,
silicon dioxide,
magnesium oxide,
calcium oxide,
calcium silicate,
sheet silicates,
aluminum silicates, and
magnesium aluminum silicate.

10. The process as claimed in claim 9, wherein the sheet silicates are mica.

11. The process as claimed in claim 1, wherein the or at least one of the substance(s) used in step (a1) as substance of component (i)
is selected from the group consisting of sheet silicates and clays that do not melt in an incongruent manner below 1500° C.
and/or
is selected from the group consisting of
the sheet silicates selected from the group consisting of kaolinite, montmorillonite and illite, and
the clays selected from the group consisting of kaolin and bentonite
and/or
wherein said resultant composite particles in step (a3) have a bulk density <500 g/L,
and/or
wherein all or some of the resultant composite particles in step (a3) have a grain size of <1.5 mm, determined by sieving.

12. The process as claimed in claim 1, wherein component (ii) comprises, as density-reducing substance(s),
one or more blowing agents and the treating in step (a3) is conducted in such a way that the one or more blowing agents expand and hence form cavities in the resultant composite particles and/or
one or more pyrolyzable fillers and the treating in step (a3) is conducted in such a way that the one or more pyrolyzable fillers pyrolyze and hence form cavities in the resultant composite particles, and/or
wherein component (i) in step (a1) comprises at least one clay, and/or
wherein the treating in step (a3) comprises sintering at a temperature in the range from 900 to 980° C., forming a sintered composite comprising components (i), (ii) and (iii), and/or
wherein the sintering in step (a3) does not exceed a temperature of 1000° C., and/or
wherein the hardened droplets are sintered in step (a3) so as to result in solid particles as intermediate, and wherein a surface of these solid particles is subsequently sealed, so as to result in said composite particles.

13. The process as claimed in claim 1, wherein the resultant composite particles in step (a3) are characterized by
(A) a whiteness W≥65, and/or
(B) a thermal conductivity value at room temperature (20° C.) γR of ≤0.26 W/m*K, and/or
(C) an alkali stability, determined as the weight loss in the course of storage in sodium hydroxide solution at pH 14 for 30 days, of ≤9% by mass, based on composite particles having a grain size in the range of 0.5-1.0 mm, and/or
(D) a grain strength ≥1.5 N/mm2, determined to DIN EN 13055-1:2008-08, Annex A (Method 1, agitating for 2*30 s with amplitude 0.5), at a grain size in the range of 0.25-0.5 mm, and/or
(E) a water absorption capacity, determined via water absorption according to Enslin, of ≤2.5 mL/g, and/or
(F) a water solubility, determined as the weight loss in the course of storage in distilled water for 30 days, of ≤2% by mass, based on composite particles having a grain size in the range of 0.5 to 1.0 mm, and/or
(G) a softening temperature ≥900° C., determined by heating microscopy.

14. The process of claim 1, wherein the hardened droplets are solid.

15. The process of claim 1, wherein droplets are provided in step (a1) by means of one or more nozzles, and/or
wherein the solidifying of the solidifiable liquid in step (a2) is induced by cooling, drying or chemical reaction, and/or
wherein the solidifiable liquid used in step (a1) is
a liquid solidifiable by chemical reaction and in step (a2) the solidifying of the solidifiable liquid is induced by chemical reaction, and/or
a liquid solidifiable by cation exchange reaction, and/or
a liquid solidifiable by reaction with calcium ions, comprising one or more binders selected from the group consisting of alginate, PVA, chitosan and sulfoxyethyl cellulose, and/or
an aqueous solution, wherein the solidifiable liquid is an aqueous alginate solution.

16. The process of claim 15, wherein the continuous solid phase is homogeneous.

17. The process of claim 1, wherein the continuous solid phase is homogeneous.

\* \* \* \* \*